United States Patent
Mitsugi et al.

(10) Patent No.: US 8,200,424 B2
(45) Date of Patent: Jun. 12, 2012

(54) NAVIGATION DEVICE

(75) Inventors: Tatsuya Mitsugi, Tokyo (JP); Chikako Takeuchi, Hyogo (JP)

(73) Assignee: Mitsubishi Electric Corporation, Tokyo (JP)

( * ) Notice: Subject to any disclaimer, the term of this patent is extended or adjusted under 35 U.S.C. 154(b) by 9 days.

(21) Appl. No.: 13/055,776

(22) PCT Filed: Sep. 16, 2009

(86) PCT No.: PCT/JP2009/004635
§ 371 (c)(1),
(2), (4) Date: Jan. 25, 2011

(87) PCT Pub. No.: WO2010/044188
PCT Pub. Date: Apr. 22, 2010

(65) Prior Publication Data
US 2011/0125402 A1   May 26, 2011

(30) Foreign Application Priority Data

Oct. 17, 2008  (JP) ................................ 2008-268802

(51) Int. Cl.
*G01C 21/30* (2006.01)
(52) U.S. Cl. ...................................... 701/409; 340/990
(58) Field of Classification Search .................. 701/400, 701/409, 446; 340/990
See application file for complete search history.

(56) References Cited

U.S. PATENT DOCUMENTS

| | | | |
|---|---|---|---|
| 7,890,252 B2 * | 2/2011 | Sekine et al. | 701/428 |
| 2004/0215388 A1 * | 10/2004 | Takenaka | 701/209 |
| 2010/0250116 A1 * | 9/2010 | Yamaguchi et al. | 701/201 |

FOREIGN PATENT DOCUMENTS

| | | |
|---|---|---|
| JP | 2005-221427 A | 8/2005 |
| JP | 2006-3166 A | 1/2006 |

* cited by examiner

*Primary Examiner* — Thomas G. Black
*Assistant Examiner* — Shardul Patel
(74) *Attorney, Agent, or Firm* — Birch, Stewart, Kolasch & Birch, LLP

(57) ABSTRACT

A navigation device calculates the distance difference between the position of a vehicle which is map-matched onto a road link, and the position acquired by perpendicular-mapping the actual position of the vehicle at a branch point onto the above-mentioned road link from the lane width K of a road lane along which the vehicle had been traveling before making a turn at the branch point, the lane width N of a road lane along which the vehicle has been traveling after making the turn, and the lane number B of the road lane before the branch point, the lane number A of the road lane after branch point, and the turning angle Θ of the vehicle at the branch point, so as to correct the vehicle position in such a way that the vehicle position is the above-mentioned perpendicular-mapped position.

4 Claims, 12 Drawing Sheets

First Lane    Second Lane

Second Lane    First Lane

Second Lane    First Lane

First Lane    Second Lane ured first with GPS (Global Positioning System) or the like, the traveling direction and traveled distance of the vehicle from the point are determined to calculate a movement vector, and this movement vector is added to the reference position to acquire the current position of the vehicle. The traveling path of the vehicle can be determined by repeating this process while the vehicle being navigated is traveling.

NAVIGATION DEVICE

FIELD OF THE INVENTION

The present invention relates to a navigation device having a function of correcting a distance error occurring in map matching.

BACKGROUND OF THE INVENTION

A locator system for use in a conventional car navigation system typically carries out a dead reckoning process of determining the traveling direction of a vehicle using a gyro sensor, also determining the traveled distance of the vehicle using a speed sensor, and using the results of the determinations. In this dead reckoning, a point which is used as a reference is measured first with GPS (Global Positioning System) or the like, the traveling direction and traveled distance of the vehicle from the point are determined to calculate a movement vector, and this movement vector is added to the reference position to acquire the current position of the vehicle. The traveling path of the vehicle can be determined by repeating this process while the vehicle being navigated is traveling.

In order to prevent an error occurring in the estimated position resulting from an error of the measurement by the gyro sensor and an error of the measurement by the speed sensor from being accumulated, a position error in the result of positioning using GPS is corrected at an arbitrary time. However, an error of about 10 m may occur also in the positioning using GPS, and the position coordinates of the vehicle may not be acquired correctly even if the vehicle position is corrected using the result of the positioning using GPS during the dead reckoning.

Furthermore, a gyro sensor mounted in currently-used car navigation systems does not have angle detection accuracy that is good enough to support all states which can occur while the vehicle is traveling, and therefore the detection result of the gyro sensor cannot easily draw a distinction between a straight ahead movement and a turn movement when the vehicle changes its heading at a narrow angle with respect to a branch point and when the vehicle makes a lane change. Therefore, it is difficult for conventional car navigation systems to determine promptly and correctly in which direction the vehicle has been headed after passing a branch point.

In contrast with this, a traveling route estimating device disclosed by, for example, patent reference 1 takes into consideration the fact that, when the vehicle is making a turn when passing through an intersection (when the vehicle is making a right- or left-hand turn), it becomes impossible to correctly specify the direction in which the vehicle is traveling because of the turn, and, when the vehicle makes a turn after having moved forwardly over a predetermined distance at which the traveling route estimating device determines whether the vehicle makes a direction change after entering the intersection, does not estimate the traveling route, whereas when the vehicles does not make a turn after having moved forwardly over the predetermined distance, the traveling route estimating device determines that the vehicle has moved straight through the intersection and then estimates the traveling route. By doing in this way, even if the traveling route estimating device prohibits the estimation of the traveling route at the time when the vehicle passes through an intersection in order not to use the traveling route in which an error occurs when the vehicle changes its direction at the branch point, the traveling route estimating device can return to the vehicle control based on the information about the traveling route at an earlier time after the vehicle has passed through the intersection.

RELATED ART DOCUMENT

Patent Reference

Patent reference 1: JP,2006-3166,A

SUMMARY OF THE INVENTION

Because conventional navigation devices cannot determine the traveling direction of a moving object, such as a vehicle, correctly when the moving object changes its direction at a branch point, a distance error resulting from the direction change at the branch point occurs in the map matching. Particularly, even when the vehicle makes a lane change frequently, the conventional navigation devices cannot determine that the vehicle has made a lane change. Furthermore, because the conventional navigation devices determine that the vehicle is moving straight even if the vehicle is snaking its way, an error occurs in the vehicle position which is measured before and after the vehicle changes its direction when making a lane change or while snaking its way at a branch point.

Furthermore, the traveling route estimating device disclosed in patent reference 1 does not use an inaccurate traveling route which it has estimated at the time when the vehicle makes a turn for the vehicle control, though the traveling route estimating device does not estimate the traveling route every time when the vehicle changes its direction toward a road branching off at an intersection, and therefore there is a possibility that errors are accumulated in the traveling route.

In addition, because there are various vehicles having different lengths according to their vehicle types and their uses, and the position where the gyro sensor is installed also varies from user to user, an error resulting from the distance between the position where the gyro sensor is installed and the position of the head of the vehicle occurs in the map matching.

The present invention is made in order to solve the above-mentioned problems, and it is therefore an object of the present invention to provide a navigation device that can appropriately correct a distance error occurring in the map matching when a moving object, such a vehicle, passes through a branch point to carry out the map matching with a high degree of precision.

In accordance with the present invention, there is provided a navigation device mounted in a moving object and provided with a positioning means for measuring a position of the above-mentioned moving object, a turning angle detecting means for detecting a turning angle of the above-mentioned moving object, and a traveling lane detecting means for detecting a traveling lane along which the above-mentioned moving object is traveling, wherein the above-mentioned navigation device includes: a turn determining means for determining a turn start and a turn end of the above-mentioned moving object at a branch point on a traveling route, which is determined from map data, on a basis of the turning angle of the above-mentioned moving object at the above-mentioned branch point which is detected by the above-mentioned turning angle detecting means; a traveling lane information acquiring means for acquiring a width of a lane of a road along which the above-mentioned moving object had been traveling before making a turn at the above-mentioned branch point and a width of a lane of a road along which the above-mentioned moving object has been traveling after making the turn at the above-mentioned branch point, and a lane number assigned to the road along which the above-mentioned moving object had been traveling before making the turn at the above-mentioned branch point and a lane number assigned to the road along which the above-mentioned moving object has been traveling after making the turn at the above-mentioned branch point from the map data by using both the traveling lane of the above-mentioned moving object detected by the above-mentioned traveling lane detecting means, and results of the determination obtained by the above-mentioned turn determining means; a matching correcting means for map-matching the position of the above-mentioned moving object measured by the above-mentioned positioning means onto a road link of the traveling route in the map data, and for calculating a distance difference between the above-mentioned position of the above-mentioned moving object which is map-matched onto the above-mentioned road link, and a position acquired by perpendicular-mapping an actual position of the above-mentioned moving object at the above-mentioned branch point onto the above-mentioned road link from the width and the lane number of the lane along which the above-mentioned moving object had been traveling before making the turn at the above-mentioned branch point and the width and the lane number of the lane along which the above-mentioned moving object has been traveling after making the turn at the above-mentioned branch point, which are acquired by the above-mentioned traveling lane information acquiring means, and the turning angle of the above-mentioned moving object at the above-mentioned branch point detected by the above-mentioned turning angle detecting means, so as to correct the position of the above-mentioned moving object in such a way that the position of the above-mentioned moving object is the above-mentioned position acquired through the perpendicular mapping.

When the vehicle makes a turn at a branch point, the navigation device in accordance with the present invention calculates the distance difference between the position of the vehicle which is map-matched onto a road link, and the position acquired by perpendicular-mapping the actual position of the vehicle at the branch point onto the above-mentioned road link from the lane width and the lane number of a road lane along which the vehicle had been traveling before making the turn at the branch point, the lane width and the lane number of a road lane along which the vehicle has been traveling after making the turn at the branch point, and the turning angle of the vehicle at the branch point, so as to correct the vehicle position in such a way that the vehicle position is the above-mentioned perpendicular-mapped position. By doing in this way, the navigation device can correct the vehicle position which the navigation device determines from the GPS positioning results at the branch point in consideration of the turn of the vehicle at the branch point to provide a correct position. Particularly, because the navigation device determines a start time at which the vehicle starts the turn and an end time at which the vehicle ends the turn and acquires the information about the lanes before and after the vehicle makes the turn at the branch point to correct the vehicle position by using this information, the navigation device can correct the distance error occurring in the vehicle position at the branch point appropriately and carry out the map matching with a high degree of precision.

EMBODIMENTS OF THE INVENTION

Hereafter, in order to explain this invention in greater detail, the preferred embodiments of the present invention will be described with reference to the accompanying drawings.

Embodiment 1

Figure 1:
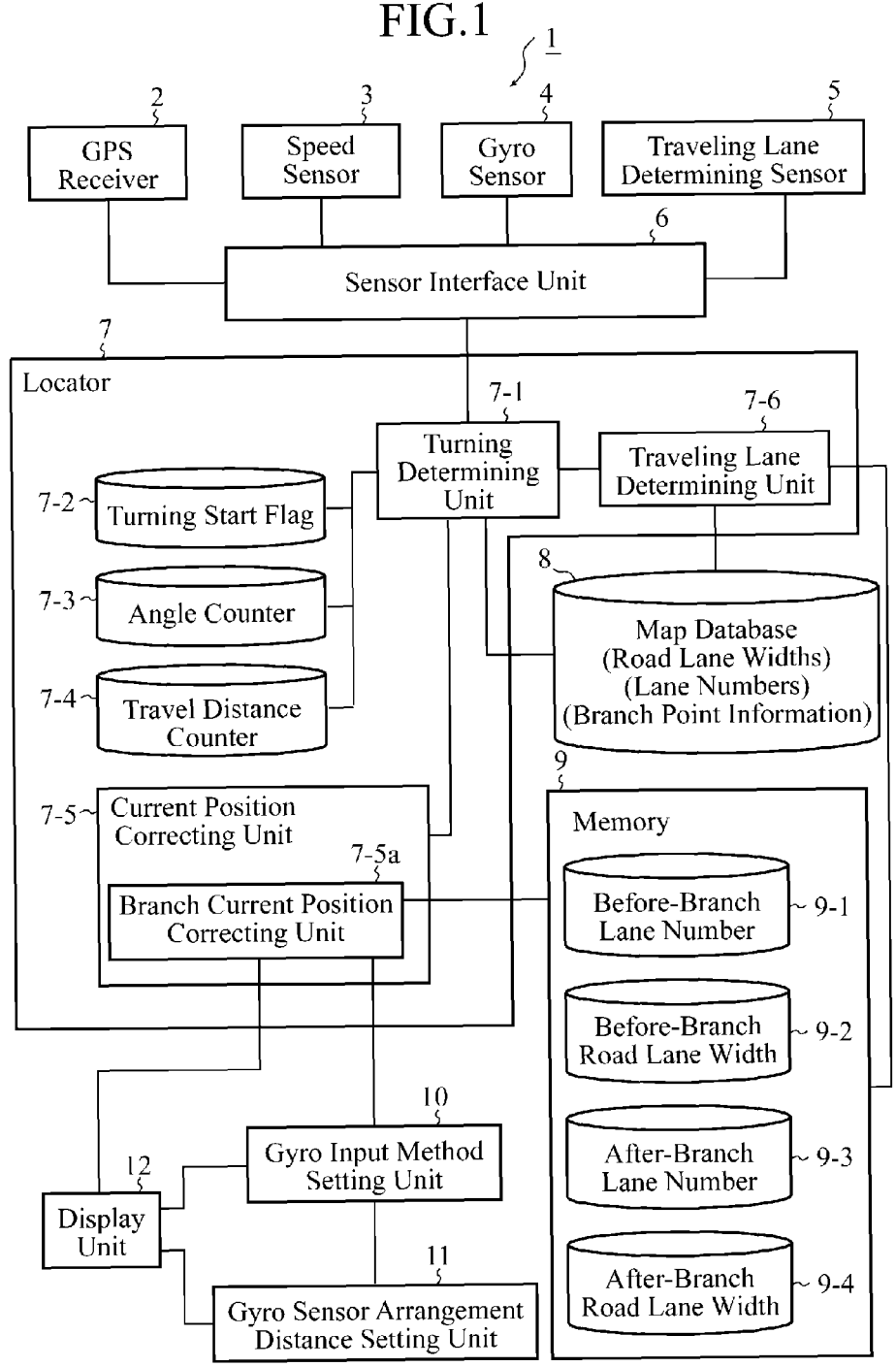
FIG. 1 is a block diagram showing the structure of a navigation device in accordance with Embodiment 1 of the present invention.

FIG. 1 is a block diagram showing the structure of a navigation device in accordance with Embodiment 1 of the present invention, and shows an example in which the present invention is applied to a vehicle-mounted navigation device. The navigation device 1 in accordance with Embodiment 1 is mounted in a moving object, such as a vehicle, and is provided with a GPS receiver (a positioning means) 2, a speed sensor 3, a gyro sensor (a turning angle detecting means) 4, a traveling lane determining sensor (a traveling lane detecting means) 5, a sensor interface unit 6, a locator 7, a map database 8, a memory 9, a gyro input method setting unit (a driving side setting means) 10, a gyro sensor arrangement distance setting unit (an attachment distance setting means) 11, and a display unit 12.

The GPS receiver 2 is a component for receiving time information and position information about the position of the vehicle by using radio navigation by reception of radio waves from GPS satellites. The speed sensor 3 detects information about the traveled distance of the vehicle by using vehicle speed pulses. The gyro sensor 4 is a sensor for measuring the turning angle of the vehicle traveling by using a gyroscope.

The traveling lane determining sensor 5 is a component for determining the traveling lane along which the vehicle is traveling. For example, the traveling lane determining sensor 5 is comprised of a sensor for determining a white line of a road along which the vehicle is traveling from a camera image captured by a vehicle-mounted camera to specify the lane of the road along which the vehicle is traveling, a sensor for determining a lane on the basis of information acquired via DSRC (Dedicated Short Range Communication), etc.

The sensor interface unit 6 is an interface disposed between the GPS receiver 2 and the various sensors 3 to 5, and the locator 7, and transmits information acquired by the GPS receiver 2 and the various sensors 3 to 5 to the locator 7.

The locator 7 is a component for calculating a position which is assumed to be the current position of the vehicle, and heading information by using the information transmitted to the sensor interface unit 6, and is provided with a turn determining unit (a turn determining means) 7-1, a turn start flag 7-2, an angle counter 7-3, a traveled distance counter 7-4, a current position correcting unit (a matching correcting means) 7-5, and a traveling lane determining unit (a traveling lane information acquiring means) 7-6.

The turn determining unit 7-1 determines whether or not the vehicle has made a turn (the vehicle has cornered) according to angle variations in a sequence of gyro angles $\Theta(T-t)$ to $\Theta(T)$ acquired from the sensor interface unit 6. T is the number of time intervals at which the turn determining unit 7-1 acquires the angle information from the sensor interface unit 6 after starting operating, and t is the number of times that sampling is done in order to determine whether or not the vehicle has made a turn, which is preset in the navigation device 1 in accordance with Embodiment 1.

When the vehicle reaches a branch point at which the vehicle starts to make a turn, a digital value of 1 is set to the turn start flag 7-2, whereas when the vehicle completes the turn, a digital value of 0 is set to the turn start flag 7-2. The angle counter 7-3 is a counter to which a gyro angle $\Delta\Theta$ which is detected by the gyro sensor 4 until the vehicle completes the turn since the vehicle starts to make the turn is added in turn. The traveled distance counter 7-4 is a counter to which a traveled distance $\Delta d$ which is detected by the speed sensor 3 until the vehicle completes the turn since the vehicle starts to make the turn is added in turn.

The current position correcting unit 7-5 is a component for correcting the position of the vehicle by using correction information and a gyro sensor arrangement distance which are acquired through a branch current position correcting process, and is provided with a branch current position correcting unit 7-5a. The branch current position correcting unit 7-5a calculates a correction distance to correct a distance error occurring in the position of the vehicle on a road link at a branch point which has been recognized by the navigation device 1 by using the lane number of a lane along which the vehicle has been traveling before making a turn at the branch point, the width of the road lane along which the vehicle has been traveling before making the turn at the branch point, the lane number of a lane along which the vehicle has been traveling after making the turn at the branch point, and the width of the road lane along which the vehicle has been traveling after making the turn at the branch point, which are read from storage units 9-1 to 9-4 of the memory 9.

The position of the vehicle on the road link which has been recognized by the navigation device 1 is acquired by matching the vehicle position measured by the GPS receiver 2 with the map data stored in the map database 8 in consideration of the traveled distance of the vehicle detected by the speed sensor 3 to correct (map matching) the measured vehicle position in such a way that the measured vehicle position is placed on the road (the road link).

The traveling lane determining unit 7-6 uses the information which the traveling lane determining unit has acquired via the sensor interface unit 6 and the information stored in the map database 8 to determine the lane number before branch and the road lane width before branch, which can be acquired at a point where the vehicle starts to make a turn, and the lane number after branch and the road lane width after branch, which can be acquired at a point where the vehicle completes the turn, and stores them in the storage units 9-1 to 9-4 of the memory 9 respectively.

The map database 8 is a database for storing map data about buildings and roads on maps, and is provided with the lane width of each road, the number of lanes of each road, and branch point information as road map information. The memory 9 is mounted in the navigation device 1 in accordance with Embodiment 1, and is provided with the storage unit 9-1 for storing the before-branch lane number B of the vehicle, the storage unit 9-2 for storing the before-branch road lane width K of the vehicle, the storage unit 9-3 for storing the after-branch lane number A of the vehicle, and the storage unit 9-4 for storing the after-branch road lane width N of the vehicle.

The gyro input method setting unit 10 is a component for providing the user with a GUI (Graphical User Interface) for displaying a selection screen on the display unit 12 to allow the user to select whether vehicles are driven on the left-hand side or right-hand side of the road, and, when the user selects to drive the vehicle on the right-hand side of the road, commands the branch current position correcting unit 7-5a to invert the sign of the value of the angle counter 7-3.

The gyro sensor arrangement distance setting unit 11 is a component for providing the user with a GUI to enable the user to input the arrangement distance of the gyro sensor 4 via the display unit 12. For example, the gyro sensor arrangement distance setting unit 11 displays a message, such as "Input the distance", on the display screen of the display unit 12, and, when the user inputs the arrangement distance of the gyro sensor 4 by using a not-shown input unit, informs this arrangement distance to the branch current position correcting unit 7-5a. The display unit 12 is constructed in such a way as to include a display, such as a liquid crystal display, and displays a navigation screen etc.

Next, the operation of the navigation device will be explained.

(1) Setting a Gyro Input Method

Figure 2:
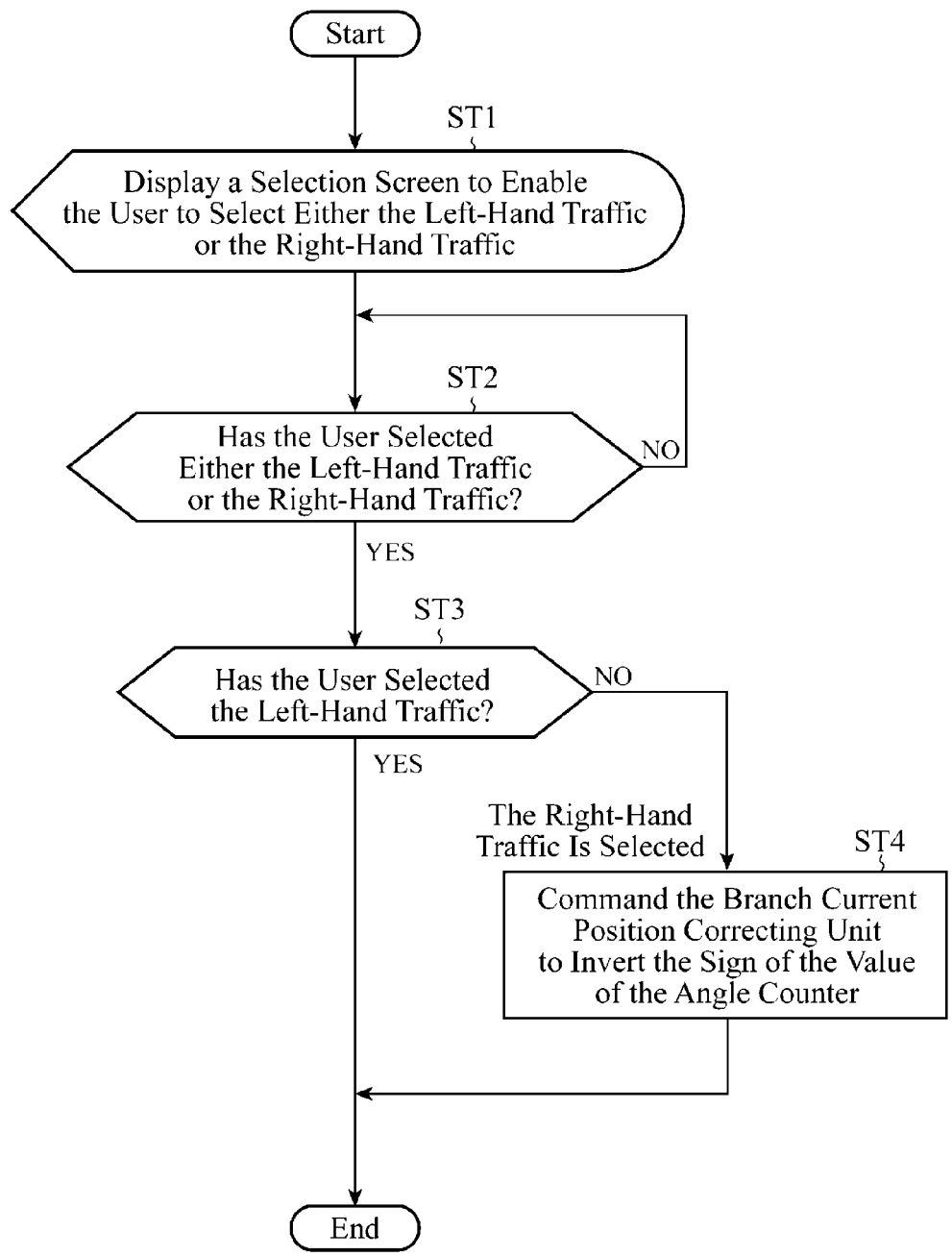
FIG. 2 is a flow chart showing a flow of a process of initially setting information showing whether a vehicle is driven on the left-hand side or right-hand side of the road to the navigation device shown in FIG. 1.

FIG. 2 is a flow chart showing a flow of a process of initially setting information showing whether the vehicle is driven on the left-hand side or right-hand side of the road to the navigation device shown in FIG. 1.

First, when the user starts the gyro input method setting unit 10 by using the not-shown input unit, the gyro input method setting unit 10 produces a selection screen display to enable the user to select whether vehicles are driven on the left-hand side or right-hand side of the road on the display screen of the display unit 12 (step ST1). After that, the gyro input method setting unit 10 makes a transition to a waiting state, and continues to display the above-mentioned selection screen on the display unit 12 until the user replies to the inquiry of whether vehicles are driven on the left-hand side or right-hand side of the road, more specifically, until the user inputs either the left-hand traffic or the right-hand traffic by using the input unit (step ST2).

When the user replies to the inquiry of whether vehicles are driven on the left-hand side or right-hand side of the road, the gyro input method setting unit 10 determines if the left-hand traffic has been selected (step ST3). In this case, when the left-hand traffic has been selected, the gyro input method setting unit 10 ends the processing without performing any processes. It is assumed that the left-hand traffic is set by default in the navigation device 1. In contrast, when the right-hand traffic has been selected by the user, the gyro input method setting unit 10 commands the branch current position correcting unit 7-5a to invert the sign of the value of the angle counter 7-3 (step ST4). After that, the gyro input method setting unit 10 ends the processing.

(2) Setting the Gyro Sensor Arrangement Distance

Figure 3:
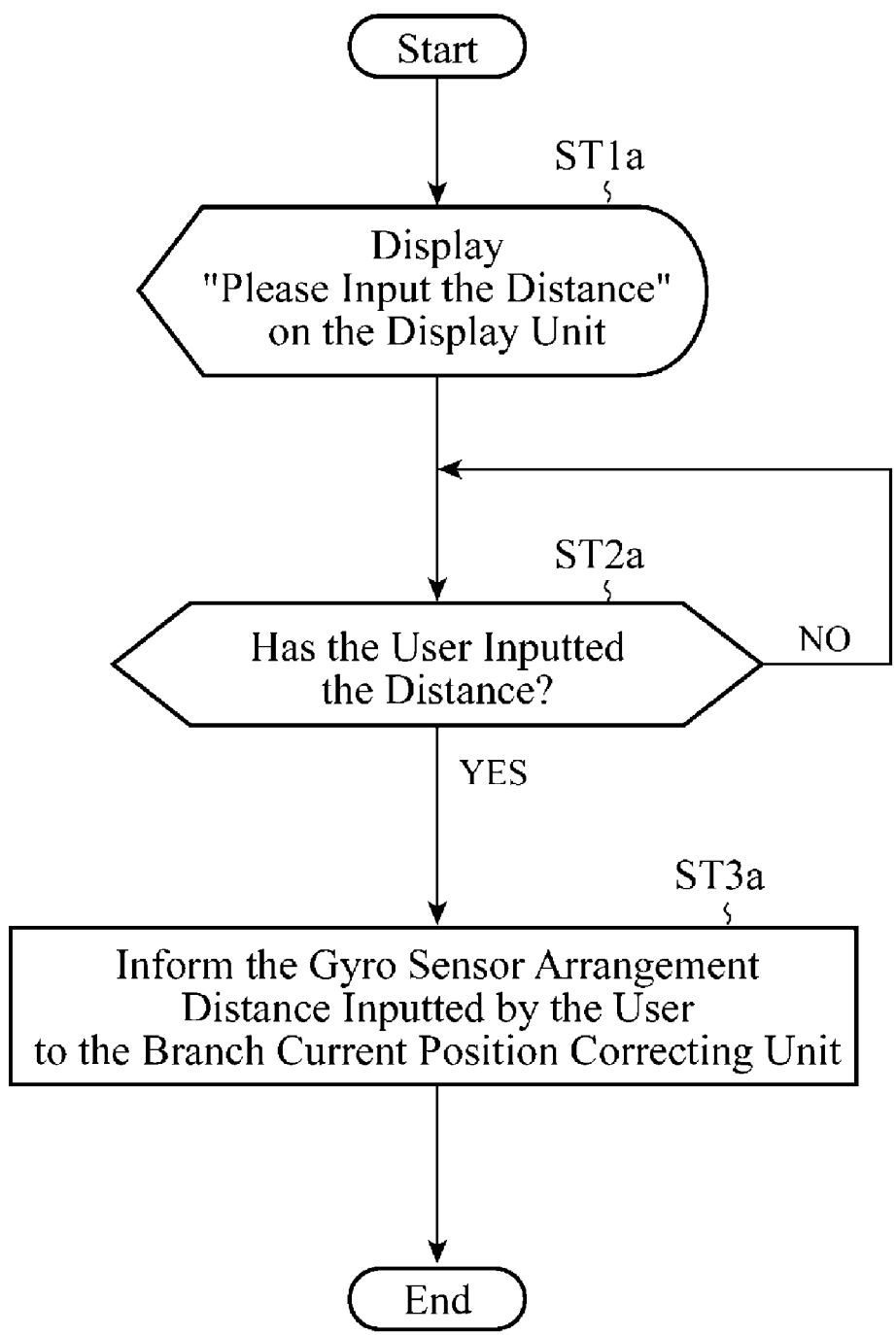
FIG. 3 is a flow chart showing a flow of a process of initially setting the arrangement distance of a gyro sensor to the navigation device shown in FIG. 1.

FIG. 3 is a flow chart showing a flow of a process of initially setting the arrangement distance of the gyro sensor to the navigation device shown in FIG. 1.

When the user starts the gyro sensor arrangement distance setting unit 11 by using the not-shown input unit, the gyro sensor arrangement distance setting unit 11 produces a setting screen display showing a setting of the arrangement distance of the gyro sensor 4 on the display screen of the display unit 12 (step ST1a). For example, the gyro sensor arrangement distance setting unit 11 displays a setting screen including a message "Input the distance" on the display unit 12.

After that, the gyro input method setting unit 10 makes a transition to a waiting state, and continues to display the above-mentioned setting screen on the display unit 12 until the user sets and inputs the arrangement distance of the gyro sensor 4, more specifically, until the user inputs the arrangement distance of the gyro sensor 4 by using the input unit (step ST2a). When the user inputs the arrangement distance of the gyro sensor 4 by using the input unit, the gyro sensor arrangement distance setting unit 11 sets the arrangement distance of the inputted gyro sensor 4 to the branch current position correcting unit 7-5a (step ST3a).

Figure 4:
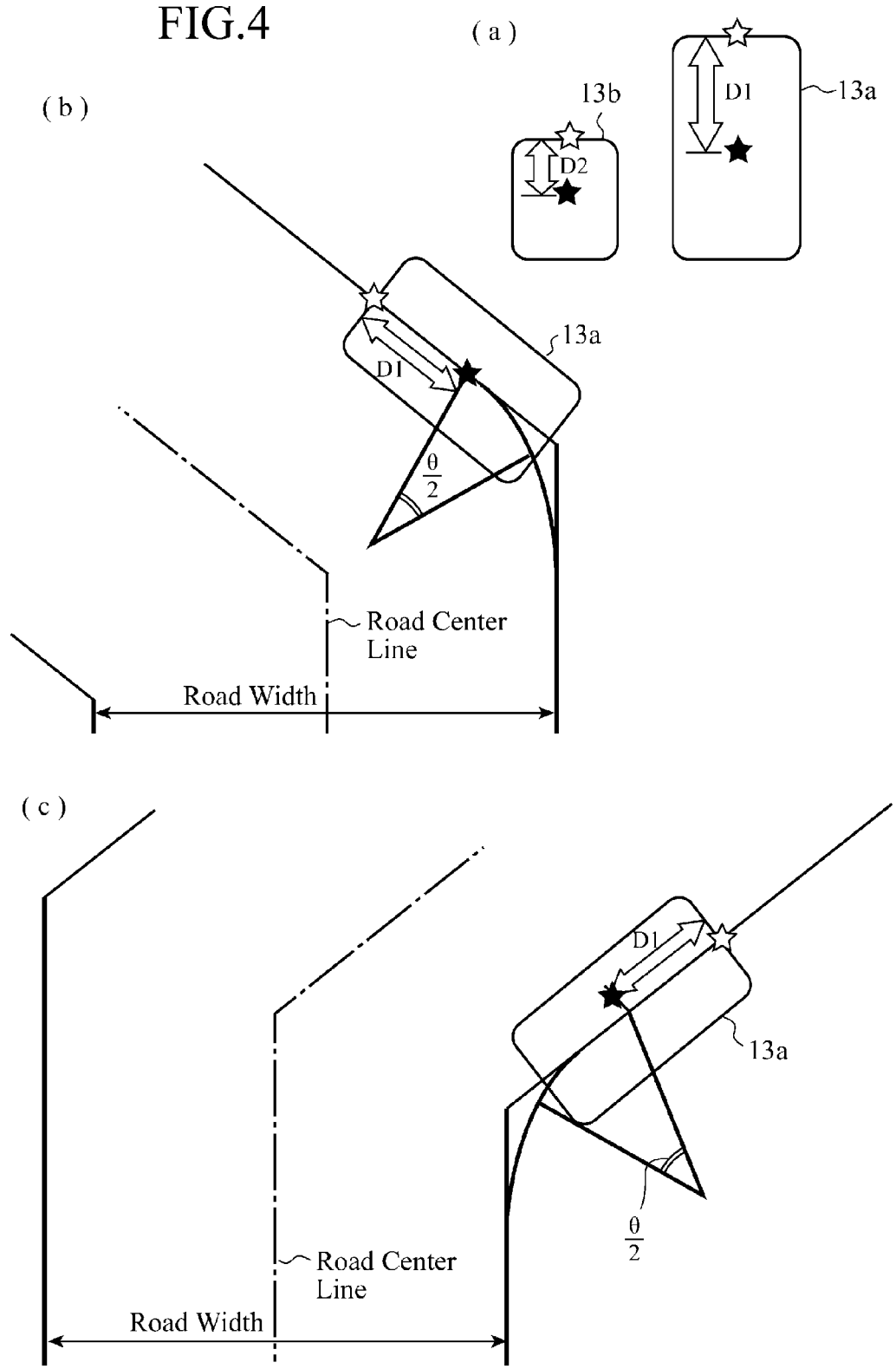
FIG. 4 is a view showing relationships between the vehicle traveling and the gyro sensor arrangement distance.

FIG. 4 is a view showing relationships between the vehicle traveling and the gyro sensor arrangement distance, FIG. 4(a) shows a relationship between the size of the vehicle and the gyro sensor arrangement distance, FIG. 4(b) shows a relationship between the size of the vehicle and the gyro sensor arrangement distance when the vehicle makes a left-hand turn, and FIG. 4(c) shows a relationship between the size of the vehicle and the gyro sensor arrangement distance when the vehicle makes a right-hand turn. A black star symbol shown in FIG. 4 shows the position where the gyro sensor 4 is installed, and a white star symbol shown in FIG. 4 shows the position of the head of the vehicle. The above-mentioned gyro sensor arrangement distance is the interval D1 or D2 between the position marked with the black star symbol, and the position marked with the white star symbol.

As shown in FIG. 4(a), the size of the vehicle owned by the user is one of various sizes, and the vehicle owned by the user can be short or long in length. Furthermore, users who own vehicles of the same length can attach their gyro sensors 4 at different positions. For example, the gyro sensor arrangement distance D1 of a vehicle 13a having a long length is longer than the gyro sensor arrangement distance D2 of a vehicle 13b having a short length. An error of the traveled distance occurs by this gyro sensor arrangement distance. Therefore, as shown in FIGS. 4(b) and 4(c), when the current position correcting unit 7-5 corrects the vehicle position by using the correction information, the current position correcting unit needs to add the distance between the installed position of the gyro sensor 4 and the head position of the vehicle (i.e., the gyro sensor arrangement distance) to the vehicle position.

(3) Determination of Whether the Vehicle Makes a Turn

The pre-processing which the navigation device carries out before the vehicle starts traveling is explained with reference to FIGS. 2 to 4.

Figure 5:
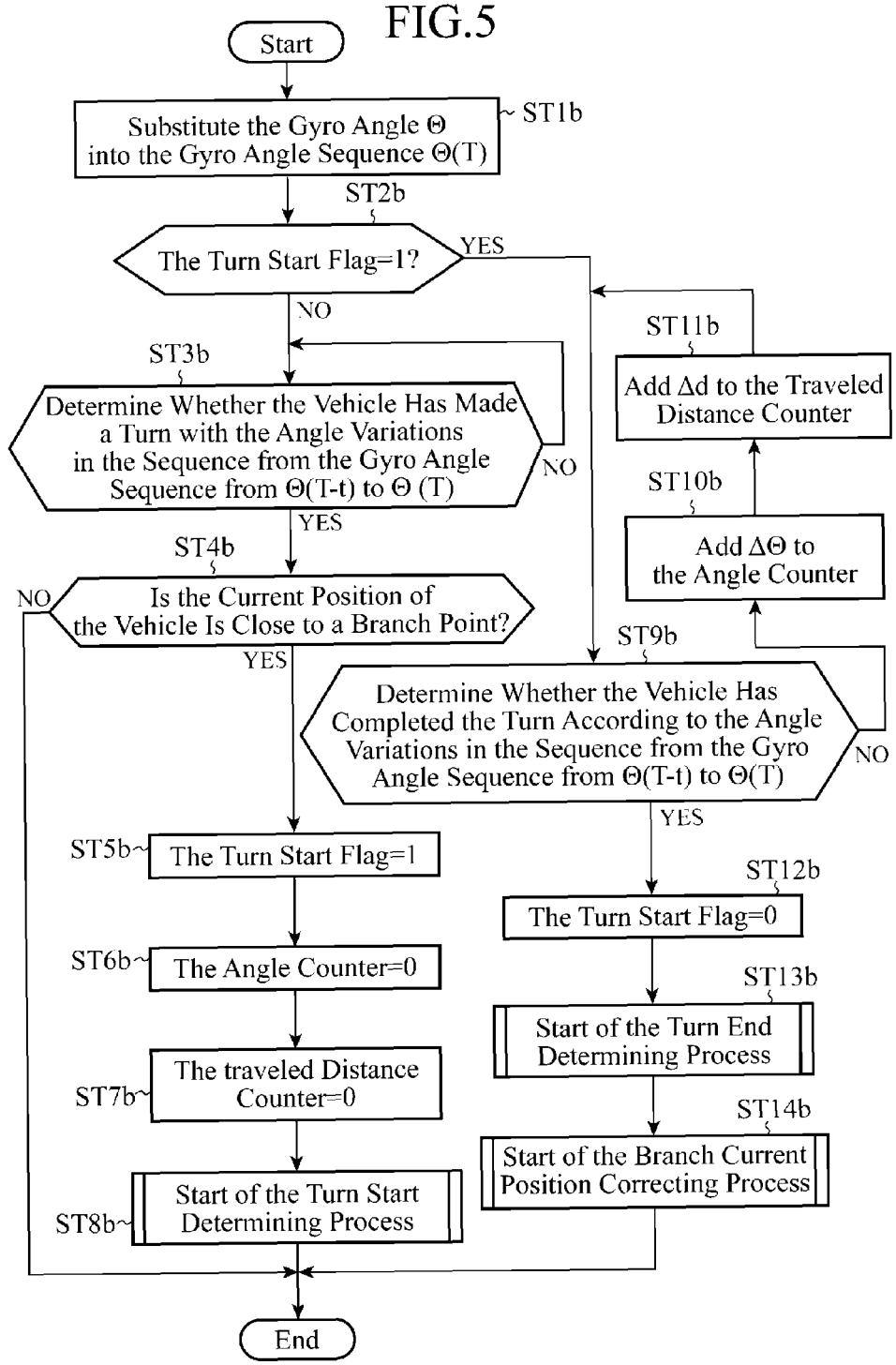
FIG. 5 is a flow chart showing a flow of a turn determining process of determining whether the vehicle makes a turn which is carried out by the navigation device shown in FIG. 1.

Hereinafter, processing which the navigation device carries out while the vehicle is traveling will be explained. FIG. 5 is a flow chart showing a flow of a turn determining process of determining whether the vehicle makes a turn which is carried out by the navigation device shown in FIG. 1. First, the turn determining unit 7-1 in the locator 7 starts with a timer and makes a request of the sensor interface unit 6 periodically to acquire the angle information detected by the gyro sensor 4 via the sensor interface unit 6. The turn determining unit 7-1 substitutes the gyro sensor angle Θ which the turn determining unit has acquired as the angle information into the gyro angle sequence Θ(T) of the angle counter 7-3 (step ST1b). T is the number of time intervals at which the turn determining unit 7-1 acquires the angle information from the sensor interface unit 6 after starting operating Next, the turn determining unit 7-1 monitors the value of the turn start flag 7-2 to determine whether or not the digital value of 1 showing a start of a turn of the vehicle is set (step ST2b). When determining that the value of the turn start flag 7-2 is not 1, and the vehicle has not start to make a turn, the turn determining unit 7-1 determines whether the vehicle has made a turn (step ST3b) from the angle variations in the sequence of gyro angles from Θ(T−t) to Θ(T) of the angle counter 7-3. t is the number of times that sampling is done in order to determine whether or not the vehicle has made a turn, which is preset in the navigation device 1 in accordance with Embodiment 1.

When determining that the vehicle has not made a turn, the turn determining unit 7-1 returns to the process of step ST3b and repeats the determination based on the angle variations in the sequence of gyro angles from Θ(T−t) to Θ(T). In contrast, when determining that the vehicle has made a turn, the turn determining unit 7-1 reads the branch information about the road from the map database 8, and then determines whether or not the current position of the vehicle is close to a branch point (step ST4b). When determining that the current position of the vehicle is not close to any branch point, the turn determining unit 7-1 ends the turn determining process.

In contrast, when, in step ST4b, determining that the current position of the vehicle is close to a branch point, the turn determining unit 7-1 sets the digital value of 1 to the turn start flag 7-2 (step ST5b), and, after initializing the value of the angle counter 7-3 to 0 (step ST6b) and also initializing the value of the traveled distance counter 7-4 to 0 (step ST7b), starts a turn start determining process which will be mentioned below with reference to FIG. 6 (step ST8b).

In contrast, when it is determined, in step ST2b, that the value of the turn start flag 7-2 is set to 1, the turn determining unit 7-1 determines whether the vehicle has completed the turn according to the angle variations in the sequence of gyro angles from Θ(T−t) to Θ(T) of the angle counter 7-3 (step ST9b). When determining that the vehicle has not completed the turn yet, the turn determining unit 7-1 adds the gyro angle ΔΘ detected by the gyro sensor 4, which the turn determining unit has acquired via the sensor interface unit 6 at that time, to the gyro angle sequence Θ of the angle counter 7-3 (step ST10b). The turn determining unit 7-1 further adds the traveled distance Δd of the vehicle detected by the speed sensor 3, which the turn determining unit has acquired via the sensor interface unit 6 at that time, to the traveled distance counter 7-4 (step ST11b). After that, the turn determining unit 7-1 returns to the process of step ST9b.

In contrast, when, in step ST9b, determining that the vehicle has not completed the turn, the turn determining unit 7-1 initializes the value of the turn start flag 7-2 to 0 (step ST12b), and then starts a turn end determining process which will be mentioned below with reference to FIG. 7 (step ST13b). When completing this turn end determining process, the turn determining unit 7-1 starts the branch current position correcting unit 7-5a so as to start a branch current position correcting process which will be mentioned below with reference to FIG. 8 (step ST14b). When this process is completed, the turn determining unit ends the turn determining process.

(3-1) Turn Start Determining Process

Figure 6:
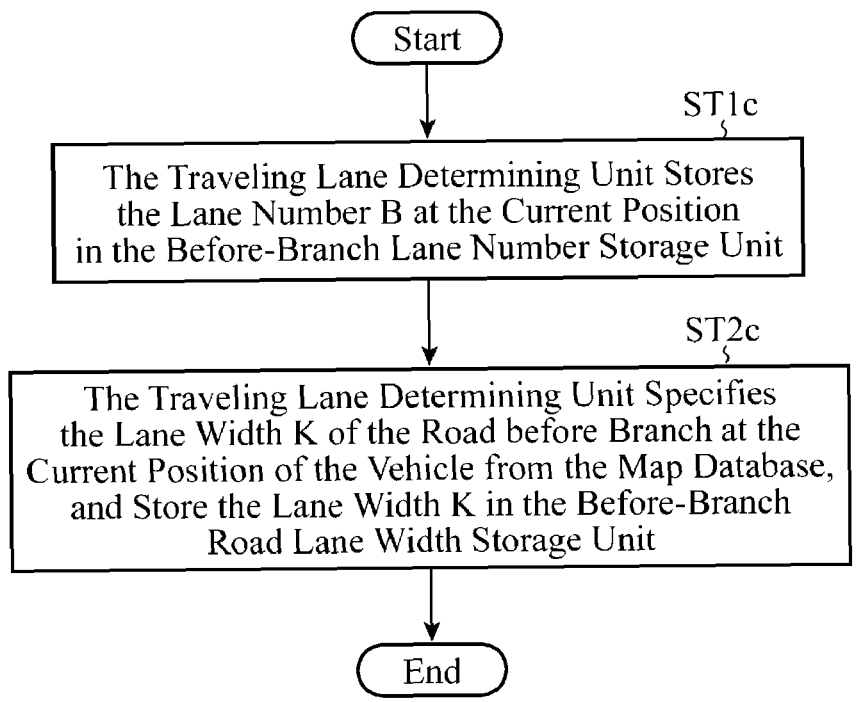
FIG. 6 is a flow chart showing a flow of a turn start determining process which is carried out by the navigation device shown in FIG. 1.

FIG. 6 is a flow chart showing a flow of the turn start determining process which is carried out by the navigation device shown in FIG. 1. After starting the turn start determining process (starting a program for the turn start determining process), the turn determining unit 7-1 issues a command of acquiring information about the traveling lane of the vehicle to the traveling lane determining unit 7-6.

According to the command from the turn determining unit 7-1, the traveling lane determining unit 7-6 uses the sensor information (the information for specifying the traveling lane of the vehicle which is detected by the traveling lane determining sensor 5) which the traveling lane determining unit has acquired via the sensor interface unit 6 and the turn determining unit 7-1, and the information stored in the map database 8 (the branch point information) to specify the lane number of the road along which the vehicle is traveling now, as the information about the traveling lane at the current position of the vehicle, and stores the lane number of the road in the storage unit 9-1 of the memory 9 as the before-branch lane number B (step ST1c).

Next, the traveling lane determining unit 7-6 specifies the width K of the lane of the road along which the vehicle is traveling before making the turn at the branch point, at the current position of the vehicle, on the basis of the branch point information read from the map database 8, and then stores the before-branch road lane width K in the storage unit 9-2 of the memory 9 (step ST2c) and ends the turn start determining process.

(3-2) Turn End Determining Process

Figure 7:
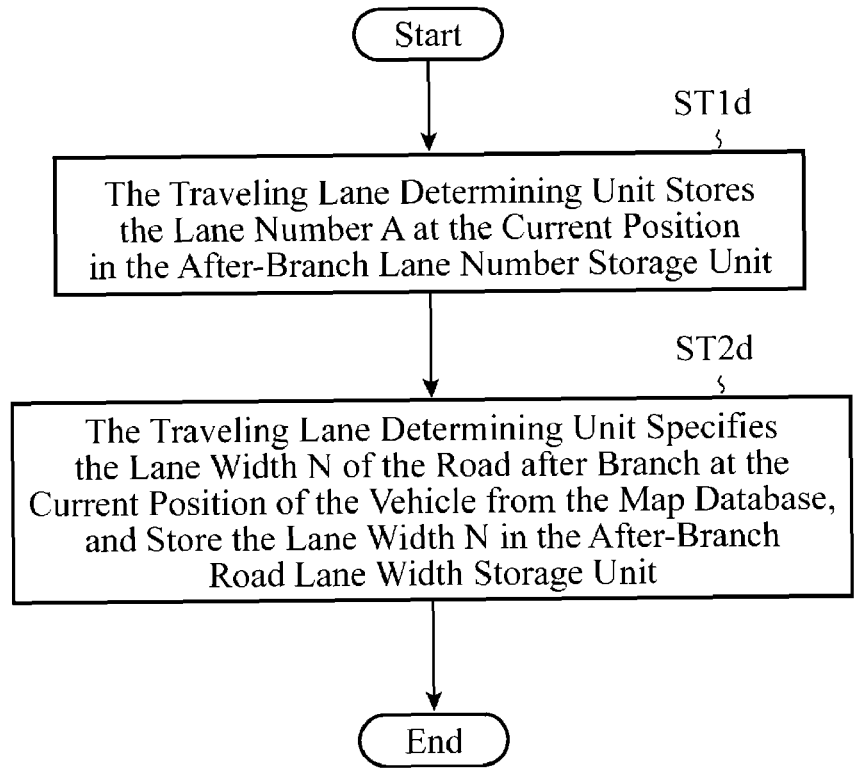
FIG. 7 is a flow chart showing a flow of a turn end determining process which is carried out by the navigation device shown in FIG. 1

FIG. 7 is a flow chart showing a flow of the turn end determining process which is carried out by the navigation device shown in FIG. 1. After starting the turn end determining process (starting a program for the turn end determining process), the turn determining unit 7-1 issues a command of acquiring information about the traveling lane of the vehicle to the traveling lane determining unit 7-6.

According to the command from the turn determining unit 7-1, the traveling lane determining unit 7-6 uses the sensor information (the information for specifying the traveling lane of the vehicle which is detected by the traveling lane determining sensor 5) which the traveling lane determining unit has acquired via the sensor interface unit 6 and the turn determining unit 7-1, and the information stored in the map database 8 (the branch point information) to specify the lane number of the road along which the vehicle is traveling now, as the information about the traveling lane at the current position of the vehicle, and stores the lane number of the road in the storage unit 9-3 of the memory 9 as the after-branch lane number A (step ST1d).

Next, the traveling lane determining unit 7-6 specifies the width N of the lane of the road along which the vehicle is traveling after making the turn at the branch point, at the current position of the vehicle, on the basis of the branch point information read from the map database 8, and then stores the after-branch road lane width N in the storage unit 9-4 of the memory 9 (step ST2d) and ends the turn end determining process.

(3-3) Branch Current Position Correcting Process

Figure 8:
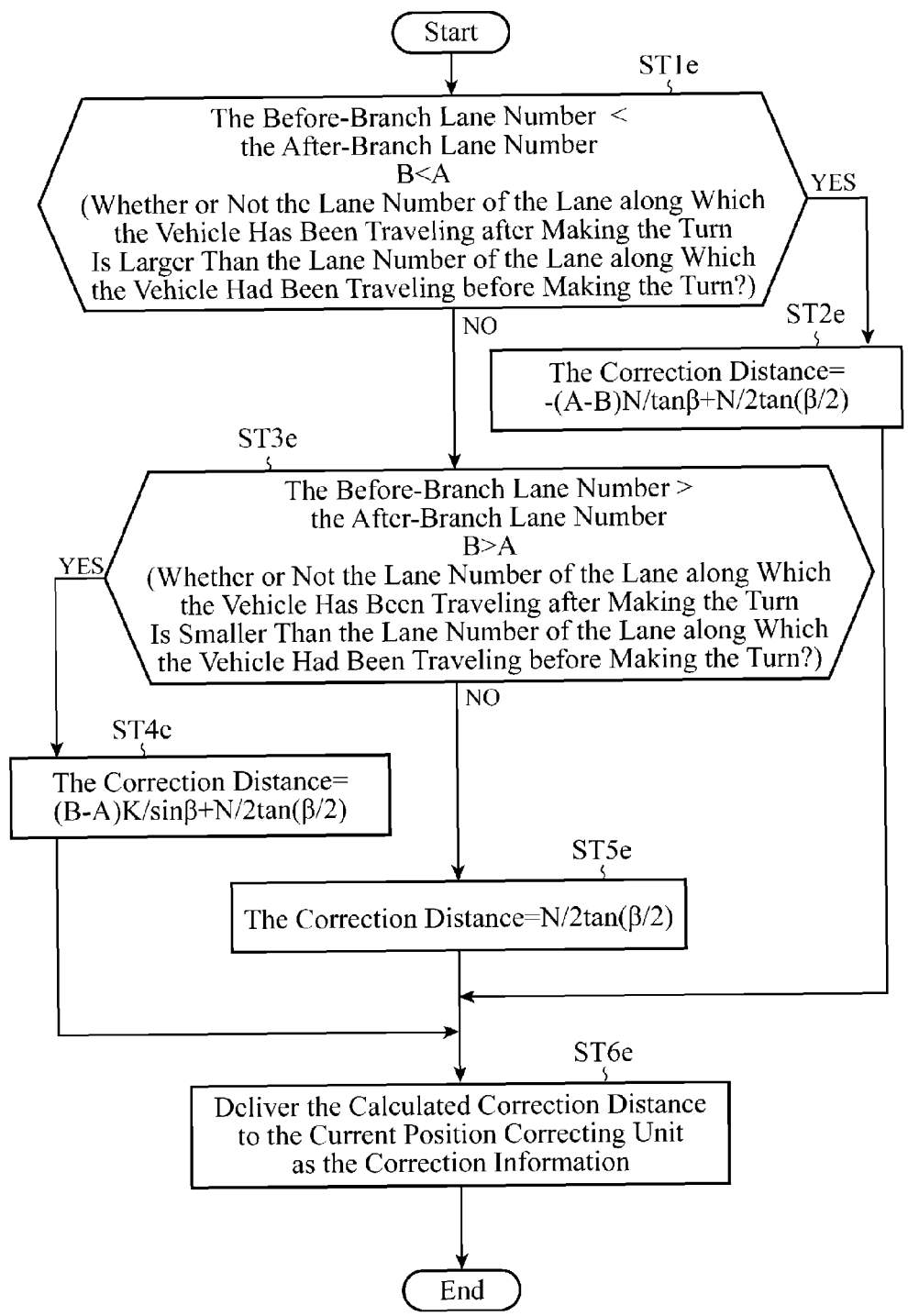
FIG. 8 is a flow chart showing a flow of a branch current position correcting process which is carried out by the navigation device shown in FIG. 1.

FIG. 8 is a flowchart showing a flow of the branch current position correcting process which is carried out by the navigation device shown in FIG. 1. After starting the branch current position correcting process (starting a program for the branch current position correcting process), the turn determining unit 7-1 issues a command of making a comparison between the before-branch lane number B and the after-branch lane number A to the branch current position correcting unit 7-5a.

According to the command from the turn determining unit 7-1, the branch current position correcting unit 7-5a reads the before-branch lane number B and the after-branch lane number A from the storage units 9-1 and 9-3 of the memory 9, and determines whether or not the after-branch lane number A is larger than the before-branch lane number B (whether or not the number of the lane along which the vehicle has been traveling after making the turn at the branch point is larger than the number of the lane along which the vehicle had been traveling before making the turn at the branch point) (step ST1e). In the left-hand traffic, the lane which is rightmost (innermost) with respect to the traveling direction is the first lane, and the lanes on the left side of the first lane which are aligned in order of increasing distance from the first lane are referred to as the second lane, the third lane, and . . . , whereas in the right-hand traffic, the lane which is leftmost (innermost) with respect to the traveling direction is the first lane, and the lanes on the right side of the first lane which are aligned in order of increasing distance from the first lane are referred to as the second lane, the third lane, and . . . .

When, in step ST1e, determining that the after-branch lane number A is larger than the before-branch lane number B, the branch current position correcting unit 7-5a determines that the vehicle had been traveling along the innermost lane (the first lane) before making the turn at the branch point, and has been traveling along the lane (the second lane) which is placed outside the innermost lane after making the turn at the branch point, and selects, as a correction distance computation expression to calculate the correction distance for correcting the vehicle position, the correction distance=−(A−B)(N/tan β)+(N/2)tan(β/2)=(B−A)(N/tan Θ)+(N/2)tan(Θ/2) (step ST2e).

After that, the branch current position correcting unit 7-5a calculates the correction distance by using the after-branch road lane width N read from the storage unit 9-4 of the memory 9, the before-branch lane number B, the after-branch lane number A, and the gyro angle Θ acquired via the sensor interface unit 6 and the turn determining unit 7-1, and according to the above-mentioned computation expression selected thereby.

In contrast, when, in step ST1e, determining that the after-branch lane number A is not larger than the before-branch lane number B, the branch current position correcting unit 7-5a determines whether or not the after-branch lane number A is smaller than the before-branch lane number B (whether or not the number of the lane along which the vehicle has been traveling after making the turn at the branch point is smaller than the number of the lane along which the vehicle had been traveling before making the turn at the branch point) (step ST3e).

When, in this step, determining that the after-branch lane number A is smaller than the before-branch lane number B, the branch current position correcting unit 7-5a determines that the vehicle had been traveling along the lane (the second lane) which is placed outside the innermost lane before making the turn at the branch point, and has been travelling along the innermost lane (the first lane) after making the turn at the branch point, and selects, as the correction distance computation expression to calculate the correction distance for correcting the vehicle position, the correction distance=(B−A)(K/sin β)+(N/2)tan(β/2)=(B−A)(K/sin Θ)+(N/2)tan(η/2) (step ST4e).

After that, the branch current position correcting unit 7-5a calculates the correction distance by using the before-branch road lane width K read from the storage unit 9-2 of the memory 9, the after-branch road lane width N, the before-branch lane number B, the after-branch lane number A, and the gyro angle Θ acquired via the sensor interface unit 6 and the turn determining unit 7-1, and according to the above-mentioned computation expression selected thereby.

When, in step ST3e, determining that the after-branch lane number A is not smaller than the before-branch lane number B, the branch current position correcting unit 7-5a determines that the before-branch lane number B is neither larger than nor smaller than the after-branch lane number A, that is, the before-branch lane number B is equal to the after-branch lane number A or at least one of the lane numbers cannot be specified, and selects, as the correction distance computation expression to calculate the correction distance for correcting the vehicle position, the correction distance=(N/2)tan(β/2)=(N/2)tan(Θ/2) (step ST5e).

After that, the branch current position correcting unit 7-5a calculates the correction distance by using the after-branch road lane width N read from the storage unit 9-4 of the memory 9 and the gyro angle Θ acquired via the sensor interface unit 6 and the turn determining unit 7-1, and according to the above-mentioned computation expression selected thereby.

After calculating the correction distance by using the computation expression selected in step ST2e, ST4e, or ST5e, the branch current position correcting unit 7-5a delivers the calculated correction distance to the current position correcting unit 7-5 as the correction information (step ST6e).

(4) Process of Correcting the Current Position

Figure 9:
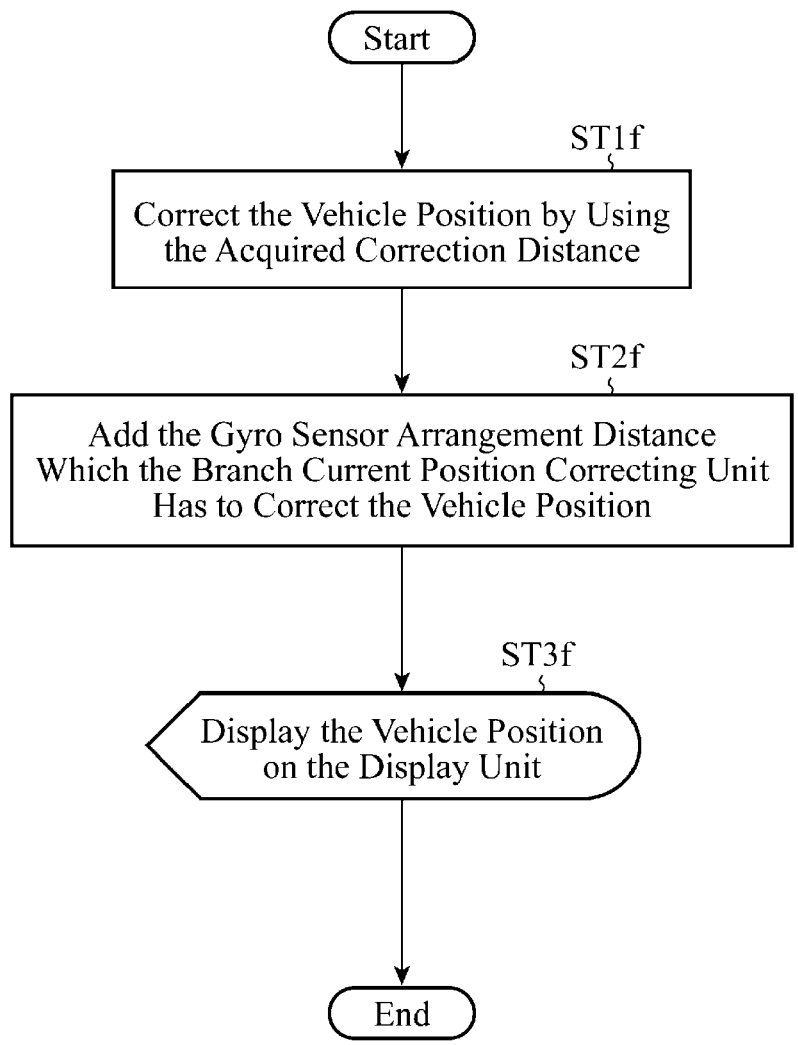
FIG. 9 is a flow chart showing a flow of a process of correcting a current position which is carried out by the navigation device shown in FIG. 1.

FIG. 9 is a flow chart showing a flow of the process of correcting the current position which is carried out by the navigation device shown in FIG. 1. First, the current position correcting unit 7-5 acquires the vehicle position measured by the GPS receiver 2, the traveled distance of the vehicle detected by the speed sensor 3, and the map data stored in the map database 8 via the sensor interface unit 6 and the turn determining unit 7-1, and matches the vehicle position measured by the GPS receiver 2 with the map data of the map database 8 in consideration of the traveled distance of the vehicle detected by the speed sensor 3 to determine the position of the vehicle which is map-matched onto a road link on a map.

Next, after acquiring the correction information (the correction distance) from the branch current position correcting unit 7-5a, the current position correcting unit 7-5 adds the correction distance acquired from the branch current position correcting unit 7-5a to the vehicle position which has been map-matched as mentioned above so as to correct the vehicle position (step ST1f).

Next, the current position correcting unit 7-5 adds the value of the gyro sensor arrangement distance, which is preset to the branch current position correcting unit 7-5a in the pre-processing, to the vehicle position calculated in step ST1f so as to further correct the vehicle position (step ST2f). After that, the current position correcting unit 7-5 displays the corrected vehicle position on the display screen of the display unit 12 (step ST3f).

(5) Derivation of the Correction Distance Computation Expressions

As mentioned above, the computation expressions for computing the correction distance according to conditions before and after the vehicle making a turn at a branch point are set up in advance in the branch current position correcting unit 7-5a. These computation expressions are derived in consideration of the following conditions.

(5-1) When the Vehicle Makes a Left-Hand Turn in the Left-Hand Traffic

Figure 10:
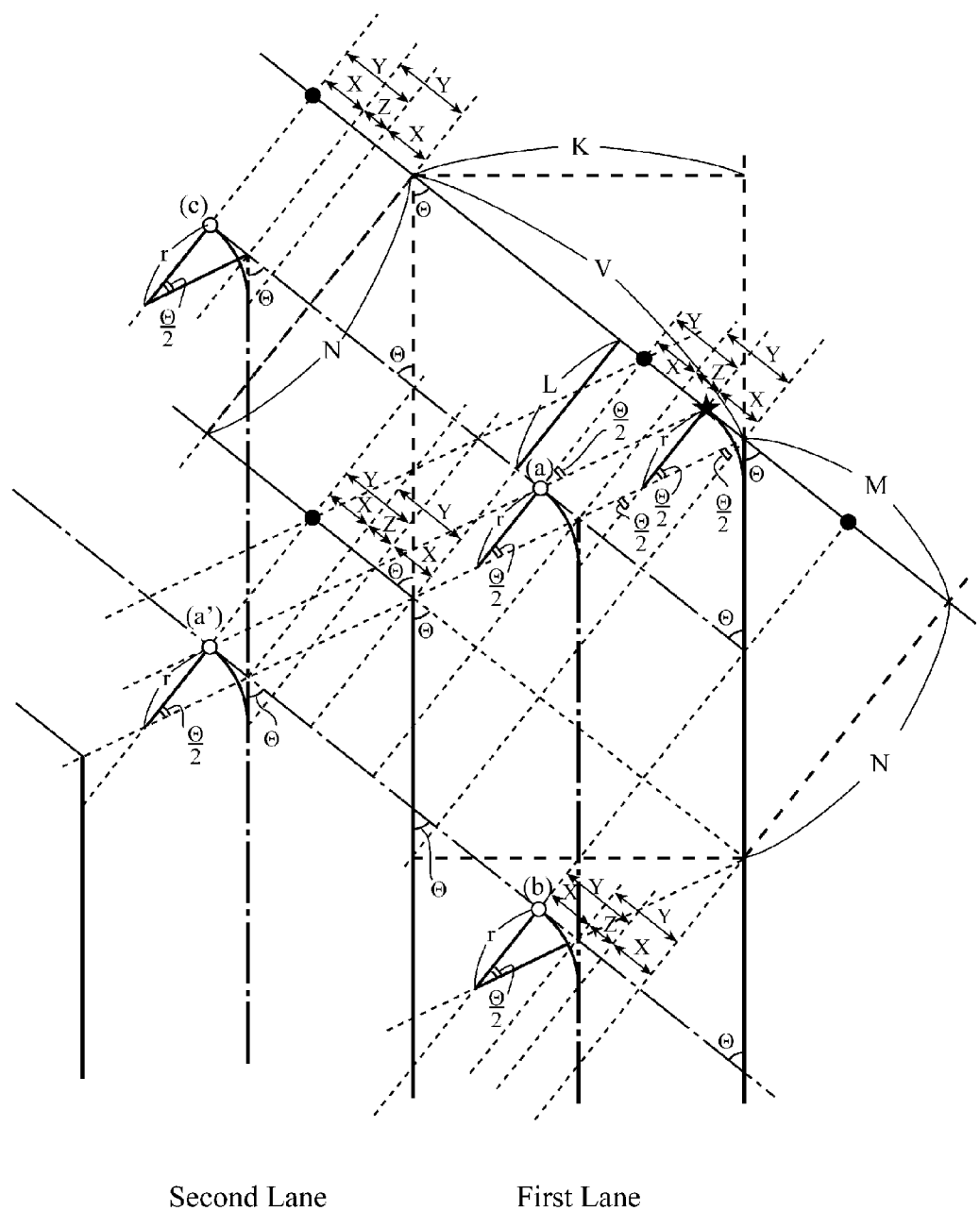
FIG. 10 is a view showing the principle underlying derivation of correction distance computation expressions at the time when the vehicle makes a left-hand turn in the left-hand traffic.

FIG. 10 is a view showing the principle underlying derivation of the correction distance computation expressions at the time when the vehicle makes a left-hand turn in the left-hand traffic. As shown in FIG. 10, in the case of the left-hand traffic, the lane numbers of the lanes of the road are referred to as the first lane, the second lane, and . . . from the right-hand side of the road in order. In this figure, each white circle symbol shows the actual vehicle position (when it is assumed that the vehicle is traveling along a center line of the road shown by a dash-dotted line in FIG. 10), a black star symbol shows the vehicle position on the road link at the branch point which is recognized by the navigation device 1, and each black circle symbol shows the position which is corrected in consideration of the distance error at the branch point of the vehicle.

The position shown by the black star symbol is the one which is acquired by matching the vehicle position measured by the GPS receiver 2 with the map data of the map database 8 in consideration of the traveled distance of the vehicle detected by the speed sensor 3 to correct (map matching) the measured vehicle position in such a way that the measured vehicle position is placed on the road (the road link). The road link passing the position shown by this black star symbol is referred to as the matching link.

Furthermore, when the map matching of the vehicle position at a branch point is carried out, a position where an arc having a point of contact on the road link before branch and defined by the turning angle of the vehicle (the vehicle width is expressed as r) is tangent to the road link after branch is determined as the vehicle position which is shown by the black star symbol in FIG. 10 and which is recognized by the navigation device 1.

In accordance with the present invention, the error occurring on the matching link of the actual vehicle position shown by each white circle symbol is corrected. More specifically, the error in the distance between the vehicle position shown by each black circle symbol and the position shown by the above-mentioned black star symbol (i.e., the distance error at the branch point of the vehicle position in the map matching) is corrected in such a way that the vehicle position shown by each black circle symbol corresponding to the perpendicular mapping from the actual vehicle position shown by the corresponding white circle symbol onto the matching link is displayed on the screen of the display unit 12.

When the vehicle makes a left-hand turn, the angle counter 7-3 counts the gyro angle Θ. When the vehicle makes a left-hand turn while traveling along the road whose lane number is two, the actual vehicle position has four possible patterns as shown by the four white circle symbols in FIG. 10, while the corrected position can be divided into the following three patterns as shown by the black circle symbols.

In the Case of (a) and (a')

In either of the cases, after making the left-hand turn, the vehicle has been traveling along the same lane as that along which the vehicle had been traveling before making the left-hand turn. In the case of (a), the vehicle had been traveling along the first lane before making the left-hand turn, and has been traveling along the first lane also after making the left-hand turn. In the case of (a'), the vehicle had been traveling along the second lane before making the left-hand turn, and has been traveling along the second lane also after making the left-hand turn.

In the Case of (b)

In this case, the vehicle had been traveling along the inner lane (the first lane) before making the left-hand turn, and has been traveling along the outer lane (the second lane) after making the left-hand turn.

In the Case of (c)

In this case, the vehicle had been traveling along the outer lane (the second lane) before making the left-hand turn, and has been traveling along the inner lane (the first lane) after making the left-hand turn. In any case in which the lane determination cannot be carried out, it can be determined that the case of (a) or (a') has occurred.

In a case in which the vehicle is traveling along the road whose lane number is 3 or more, no change is made to the correction distance in the case of (a) or (a'), the correction distance is calculated by using M which is multiplied by a factor of (A−B) in the case of (b), and the correction distance is calculated by using V which is multiplied by a factor of (B−A) in the case of (c). The calculation of the correction distance is carried out by using the before-branch road lane number B, the after-branch road lane number A, the before-branch road lane width K, the after-branch road lane width N (N is two times as long as the distance width L from the center line of the road after branch), the distance width L from the center line of the road after branch, and the value β of the angle counter 7-3.

Calculation of the Correction Distance

In the Case of (a) and (a')

It is necessary to advance the vehicle position on the matching link (the black star symbol) toward the traveling direction (a positive direction) by the correction distance: (Z+X) so as to correct the vehicle position to provide the corrected position (the black circle symbol). In this case, X is given by X=r tan(Θ/2) when the vehicle width is expressed as r. Since Z=Y−X, (Z+X)=(Y−X+X) and the correction distance is equal to Y. Furthermore, by taking into consideration N=2L, the following equation is obtained.

$$Y=L\tan(\beta/2)=L\tan(\beta/2)=(N/2)\tan(\beta/2)$$

Thus, because the correction distance has a positive value, the vehicle position is corrected in such a way that the position of the vehicle after making the left-hand turn is advanced.

Because the same computation expression to calculate the correction distance can be used even in the case in which the vehicle is traveling along the road whose lane number is 3 or more, the correction distance in the case of (a) and (a') can be shown by the following equation.

$$\text{Correction Distance}=(N/2)\tan(\beta/2)$$

In the Case of (b)

It is necessary to correct the vehicle position (the black star symbol) on the matching link to provide the corrected position (the black circle symbol) which is retarded toward a direction opposite to the traveling direction (a negative direction) by the correction distance: −(X+M−X−Z−X). In this case, by taking into consideration the correction distance Y=X+Z and Y=L tan(Θ/2)=L tan(Θ/2)=(N/2)tan(β/2), the following equation: −M+X+Z=−M+Y is obtained.

Therefore, the following equation: −M+Y=−M+L tan(β/2) is obtained, and, since M=N/tan Θ=N/tan β, the correction distance Y is given by −(N/tan β)+L tan(β/2).

By substituting the following relationship: N=2L into this equation, the correction distance can be expressed by the following equation.

$$\text{Correction distance } Y=-(N/\tan\beta)+(N/2)\tan(\beta/2)$$

In the case in which the vehicle is traveling along the road whose lane number is two, (A−B) is (2−1) and M is multiplied by 1, and in the case in which the vehicle is traveling along the road whose lane number is three or more, M is multiplied by a factor of (A−B). Therefore, the correction distance in the case of (b) can be shown by the following equation.

$$\text{Correction distance}=(B-A)(N/\tan\beta)+(N/2)\tan(\beta/2)$$

In the Case of (c)

It is necessary to correct the vehicle position (the black star symbol) on the matching link to provide the corrected position (the black circle symbol) which is advanced toward the traveling direction (the positive direction) by the correction distance: (V−X+X+Z+X). In this case, Z=Y−X, and (V+Z+X)=V+(Y−X)+X.

Furthermore, because the correction distance Y is equal to V+Y, Y=L tan(Θ/2)=L tan(β/2), and N=2L and V=K/sin Θ=K/sin β, the correction distance Y can be expressed by the following equation.

$$Y=V+Y=(K/\sin\beta)+(N/2)\tan(\beta/2)$$

In the case in which the vehicle is traveling along the road whose lane number is two, (B−A) is (2−1) and V is multiplied by 1, and in the case in which the vehicle is traveling along the road whose lane number is three or more, V is multiplied by a factor of (B−A). Therefore, the correction distance in the case of (c) can be shown by the following equation.

$$\text{Correction distance}=(B-A)(K/\sin\beta)+(N/2)\tan(\beta/2)$$

(5-2) When the Vehicle Makes a Right-Hand Turn in the Left-Hand Traffic

Figure 11:
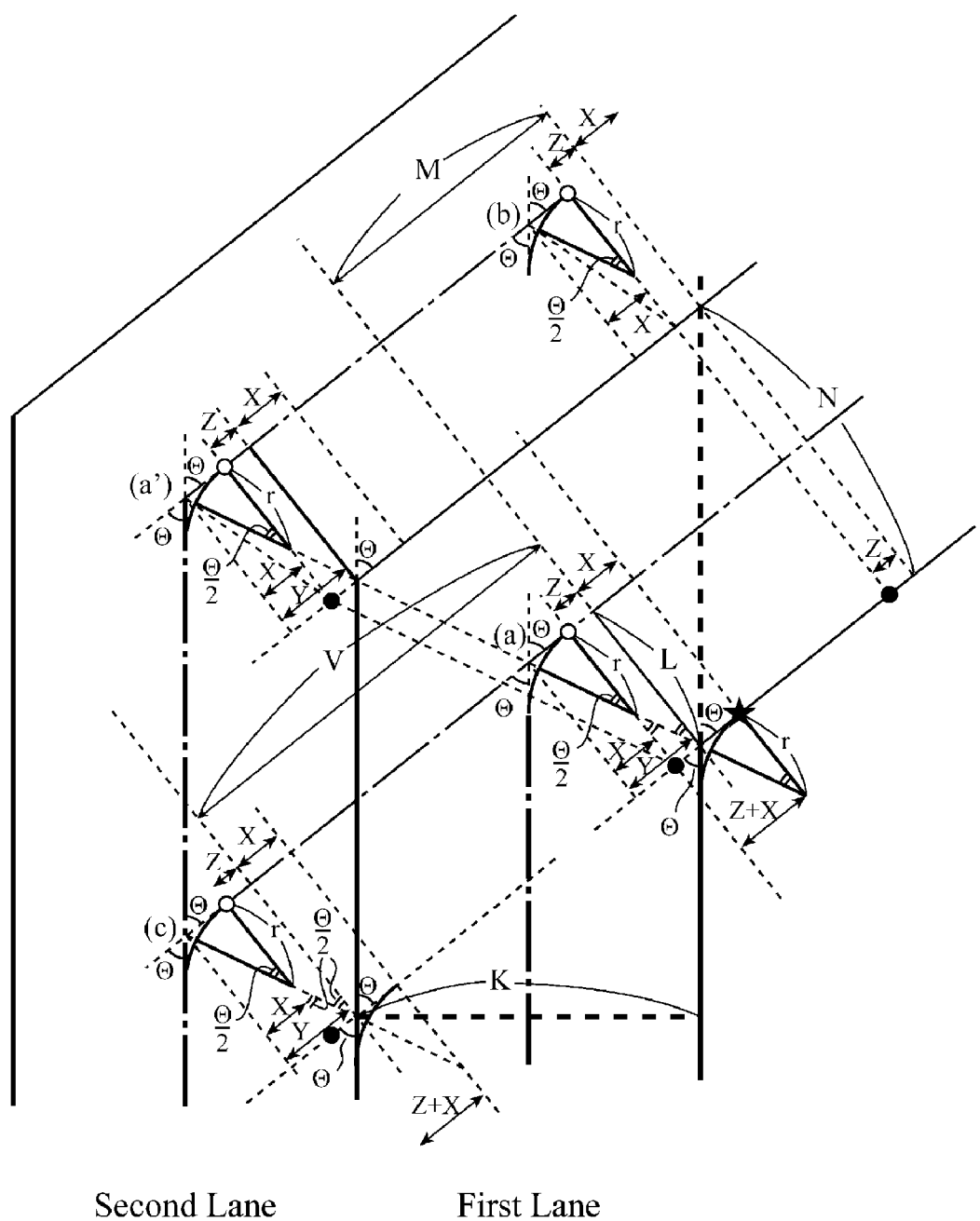
FIG. 11 is a view showing the principle underlying derivation of the correction distance computation expressions at the time when the vehicle makes a right-hand turn in the left-hand traffic.

FIG. 11 is a view showing the principle underlying derivation of the correction distance computation expressions at the time when the vehicle makes a right-hand turn in the left-hand traffic. As shown in FIG. 11, in the case of the left-hand traffic, the lane numbers of the lanes of the road are referred to as the first lane, the second lane, and . . . from the right-hand side of the road in order. In this figure, each white circle symbol shows the actual vehicle position, a black star symbol shows the vehicle position on the matching link which is recognized by the navigation device 1, and each black circle symbol shows the position which is corrected in consideration of the distance error at the branch point of the vehicle.

When the vehicle makes a right-hand turn, the angle counter 7-3 counts the gyro angle −Θ. When the vehicle makes a right-hand turn while traveling along the road whose lane number is two, the actual vehicle position has four possible patterns as shown by the four white circle symbols in FIG. 11, while the corrected position can be divided into the following three patterns as shown by the black circle symbols.

In the Case of (a) and (a')

In either of the cases, after making the right-hand turn, the vehicle has been traveling along the same lane as that along which the vehicle had been traveling before making the right-hand turn. In the case of (a), the vehicle had been traveling along the first lane before making the right-hand turn, and has been traveling along the first lane also after making the right-hand turn. In the case of (a'), the vehicle had been traveling along the second lane before making the right-hand turn, and has been traveling along the second lane also after making the right-hand turn.

In the Case of (b)

In this case, the vehicle had been traveling along the inner lane (the first lane) before making the right-hand turn, and has been traveling along the outer lane (the second lane) after making the right-hand turn.

In the Case of (c)

In this case, the vehicle had been traveling along the outer lane (the second lane) before making the right-hand turn, and has been traveling along the inner lane (the first lane) after making the right-hand turn. In any case in which the lane determination cannot be carried out, it can be determined that the case of (a) or (a') has occurred.

In a case in which the vehicle is traveling along the road whose lane number is 3 or more, no change is made to the correction distance in the case of (a) or (a'), the correction distance is calculated by using M which is multiplied by a factor of (A−B) in the case of (b), and the correction distance is calculated by using V which is multiplied by a factor of (B−A) in the case of (c). The calculation of the correction distance is carried out by using the before-branch road lane number B, the after-branch road lane number A, the before-branch road lane width K, the after-branch road lane width N (N is two times as long as the distance width L from the center line of the road after branch), the distance width L from the center line of the road after branch, and the value β of the angle counter 7-3.

Calculation of the Correction Distance

In the Case of (a) and (a')

It is necessary to advance the vehicle position on the matching link (the black star symbol) toward the traveling direction (the positive direction) by the correction distance: −(Z+X) so as to correct the vehicle position to provide the corrected position (the black circle symbol). Since Z=Y−X, −(Z+X)=−(Y−X+X) and the correction distance is equal to −Y. Furthermore, by taking into consideration N=2L, the following equation is obtained.

$$-Y = L\tan(-\Theta/2) = L\tan(\beta/2) = (N/2)\tan(\beta/2)$$

Thus, because the correction distance has a negative value, the vehicle position is corrected in such a way that the position of the vehicle after making the right-hand turn is retarded. Because the same computation expression to calculate the correction distance can be used even in the case in which the vehicle is traveling along the road whose lane number is 3 or more, the correction distance in the case of (a) and (a') can be shown by the following equation.

$$\text{Correction distance} = (N/2)\tan(\beta/2)$$

In the Case of (b)

It is necessary to correct the vehicle position (the black star symbol) on the matching link to provide the corrected position (the black circle symbol) which is advanced toward the traveling direction (the positive direction) by the correction distance: (M−Z−X). In this case, by taking into consideration Z=Y−X and −Y=L tan(−β/2)=L tan(β/2), the following equation: M−Z−X=M−Y is obtained.

Therefore, the following equation: M−Y=M+L tan(β/2) is obtained, and, since M=−N/tan(−Θ)=−N/tan β, the correction distance Y is given by −(N/tan β)+L tan(β/2).

By substituting the following relationship: N=2L into this equation, the correction distance can be expressed by the following equation.

$$\text{Correction distance } Y = -(N/\tan\beta) + (N/2)\tan(\beta/2)$$

In the case in which the vehicle is traveling along the road whose lane number is two, (A−B) is (2−1) and M is multiplied by 1, and in the case in which the vehicle is traveling along the road whose lane number is three or more, M is multiplied by a factor of (A−B). Therefore, the correction distance in the case of (b) can be shown by the following equation.

$$\text{Correction distance} = (B-A)(N/\tan\beta) + (N/2)\tan(\beta/2)$$

In the Case of (c)

It is necessary to correct the vehicle position (the black star symbol) on the matching link to provide the corrected position (the black circle symbol) which is advanced toward the traveling direction (the positive direction) by the correction distance: −(X+V+Z). In this case, Z=Y−X, and −(X+V+Z)=−(X+V+Y−X). Furthermore, because the correction distance Y is equal to −V−Y, −Y=L tan(Θ/2)=L tan(β/2)=(N/2)tan(β/2), and −V=K/sin(−Θ)=K/sin β, the correction distance Y can be expressed by the following equation.

$$Y = -V - Y = (K/\sin\beta) + (N/2)\tan(\beta/2)$$

In the case in which the vehicle is traveling along the road whose lane number is two, (B−A) is (2−1) and V is multiplied by 1, and in the case in which the vehicle is traveling along the road whose lane number is three or more, V is multiplied by a factor of (B−A). Therefore, the correction distance in the case of (c) can be shown by the following equation.

$$\text{Correction distance} = (B-A)(K/\sin\beta) + (N/2)\tan(\beta/2)$$

(5-3) When the Vehicle Makes a Left-Hand Turn in the Right-Hand Traffic

Figure 12:
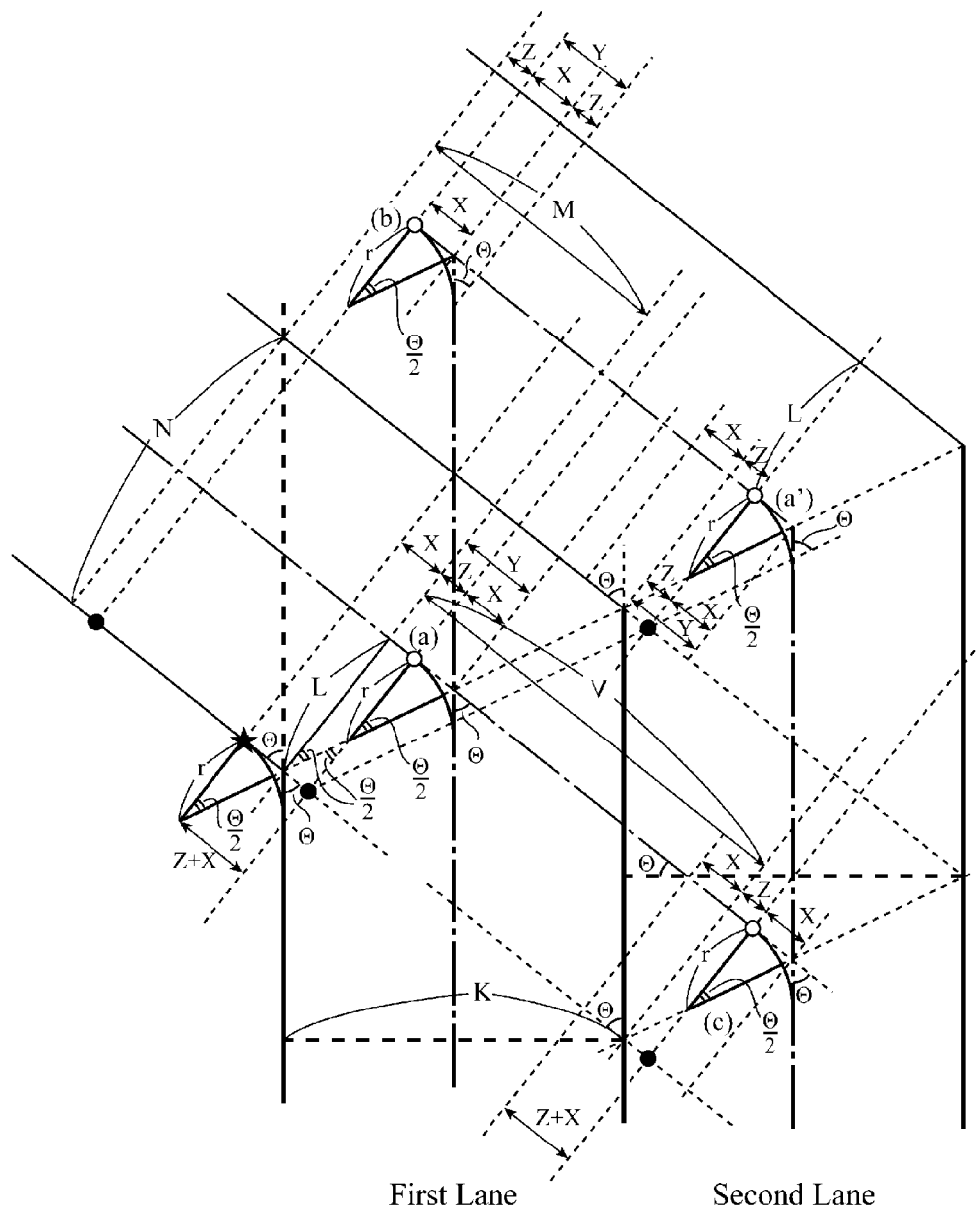
FIG. 12 is a view showing the principle underlying derivation of the correction distance computation expressions at the time when the vehicle makes a left-hand turn in the right-hand traffic.

FIG. 12 is a view showing the principle underlying derivation of the correction distance computation expressions at the time when the vehicle makes a left-hand turn in the right-hand traffic. As shown in FIG. 12, in the case of the right-hand traffic, the lane numbers of the lands of the road are referred to as the first lane, the second lane, and . . . from the left-hand side of the road in order. In this figure, each white circle symbol shows the actual vehicle position, a black star symbol shows the vehicle position on the matching link which is recognized by the navigation device 1, and each black circle symbol shows the position which is corrected in consideration of the distance error at the branch point of the vehicle.

When the vehicle makes a left-hand turn, the angle counter 7-3 counts the gyro angle −Θ. When the vehicle makes a left-hand turn while traveling along the road whose lane number is two, the actual vehicle position has four possible patterns as shown by the four white circle symbols in FIG. 12, while the corrected position can be divided into the following three patterns as shown by the black circle symbols.

In the Case of (a) and (a')

In either of the cases, after making the left-hand turn, the vehicle has been traveling along the same lane as that along which the vehicle had been traveling before making the left-hand turn. In the case of (a), the vehicle had been traveling along the first lane before making the left-hand turn, and has been traveling along the first lane also after making the left-hand turn. In the case of (a'), the vehicle had been traveling along the second lane before making the left-hand turn, and has been traveling along the second lane also after making the left-hand turn.

In the Case of (b)

In this case, the vehicle had been traveling along the inner lane (the first lane) before making the left-hand turn, and has been traveling along the outer lane (the second lane) after making the left-hand turn.

In the Case of (c)

In this case, the vehicle had been traveling along the outer lane (the second lane) before making the left-hand turn, and has been traveling along the inner lane (the first lane) after making the left-hand turn. In any case in which the lane determination cannot be carried out, it can be determined that the case of (a) or (a') has occurred.

In a case in which the vehicle is traveling along the road whose lane number is 3 or more, no change is made to the correction distance in the case of (a) or (a'), the correction distance is calculated by using M which is multiplied by a factor of (A−B) in the case of (b), and the correction distance is calculated by using V which is multiplied by a factor of (B−A) in the case of (c). The calculation of the correction distance is carried out by using the before-branch road lane number B, the after-branch road lane number A, the before-branch road lane width K, the after-branch road lane width N (N is two times as long as the distance width L from the center line of the road after branch), the distance width L from the center line of the road after branch, and the value β of the angle counter 7-3.

Calculation of the Correction Distance

In the Case of (a) and (a')

It is necessary to advance the vehicle position on the matching link (the black star symbol) toward the traveling direction (the positive direction) by the correction distance: −(Z+X) so as to correct the vehicle position to provide the corrected position (the black circle symbol). Since Z=Y−X, −(Z+X)=−(Y−X+X) and the correction distance is equal to −Y. Furthermore, by taking into consideration N=2L, the following equation is obtained.

$$-Y=L\tan(-\Theta/2)=L\tan(\beta/2)=(N/2)\tan(\beta/2)$$

Thus, because the correction distance has a negative value, the vehicle position is corrected in such a way that the position of the vehicle after making the left-hand turn is retarded with respect to the traveling direction. Because the same computation expression to calculate the correction distance can be used even in the case in which the vehicle is traveling along the road whose lane number is 3 or more, the correction distance in the case of (a) and (a') can be shown by the following equation.

$$\text{Correction distance}=(N/2)\tan(\beta/2)$$

In the Case of (b)

It is necessary to correct the vehicle position (the black star symbol) on the matching link to provide the corrected position (the black circle symbol) which is advanced toward the traveling direction (the positive direction) by the correction distance: (M−X−Z). In this case, by taking into consideration the correction distance Y=X+Z and −Y=L tan(−Θ/2)=L tan (β/2)=(N/2)tan(β/2), the following equation: M−Z−X=M−(X+Z)=M−Y is obtained.

Therefore, the following equation: M−Y=M+L tan(β/2) is obtained, and, since M=−N/tan(−Θ)=−N/tan β, the correction distance Y is given by −(N/tan β)+L tan(β/2).

By substituting the following relationship: N=2L into this equation, the correction distance can be expressed by the following equation.

$$\text{Correction distance } Y=-(N/\tan\beta)+(N/2)\tan(\beta/2)$$

In the case in which the vehicle is traveling along the road whose lane number is two, (A−B) is (2−1) and M is multiplied by 1, and in the case in which the vehicle is traveling along the road whose lane number is three or more, M is multiplied by a factor of (A−B). Therefore, the correction distance in the case of (b) can be shown by the following equation.

$$\text{Correction distance}=(B-A)(N/\tan\beta)+(N/2)\tan(\beta/2)$$

In the Case of (c)

It is necessary to correct the vehicle position (the black star symbol) on the matching link to provide the corrected position (the black circle symbol) which is retarded toward the direction opposite to the traveling direction (the negative direction) by the correction distance: −(X+V+Z). In this case, Z=Y−X, and −(X+V+Z)=−(X+V+Y−X). Furthermore, because the correction distance Y is equal to −V−Y, −Y=L tan (β/2)=L tan(β/2), and N=2L and −V=K/sin(−Θ)=K/sin β, the correction distance Y can be expressed by the following equation.

$$Y=-V-Y=(K/\sin\beta)+(N/2)\tan(\beta/2)$$

In the case in which the vehicle is traveling along the road whose lane number is two, (B−A) is (2−1) and V is multiplied by 1, and in the case in which the vehicle is traveling along the road whose lane number is three or more, V is multiplied by a factor of (B−A). Therefore, the correction distance in the case of (c) can be shown by the following equation.

$$\text{Correction distance}=(B-A)(K/\sin\Theta)+(N/2)\tan(\beta/2)$$

(5-4) When the Vehicle Makes a Right-Hand Turn in the Right-Hand Traffic

Figure 13:
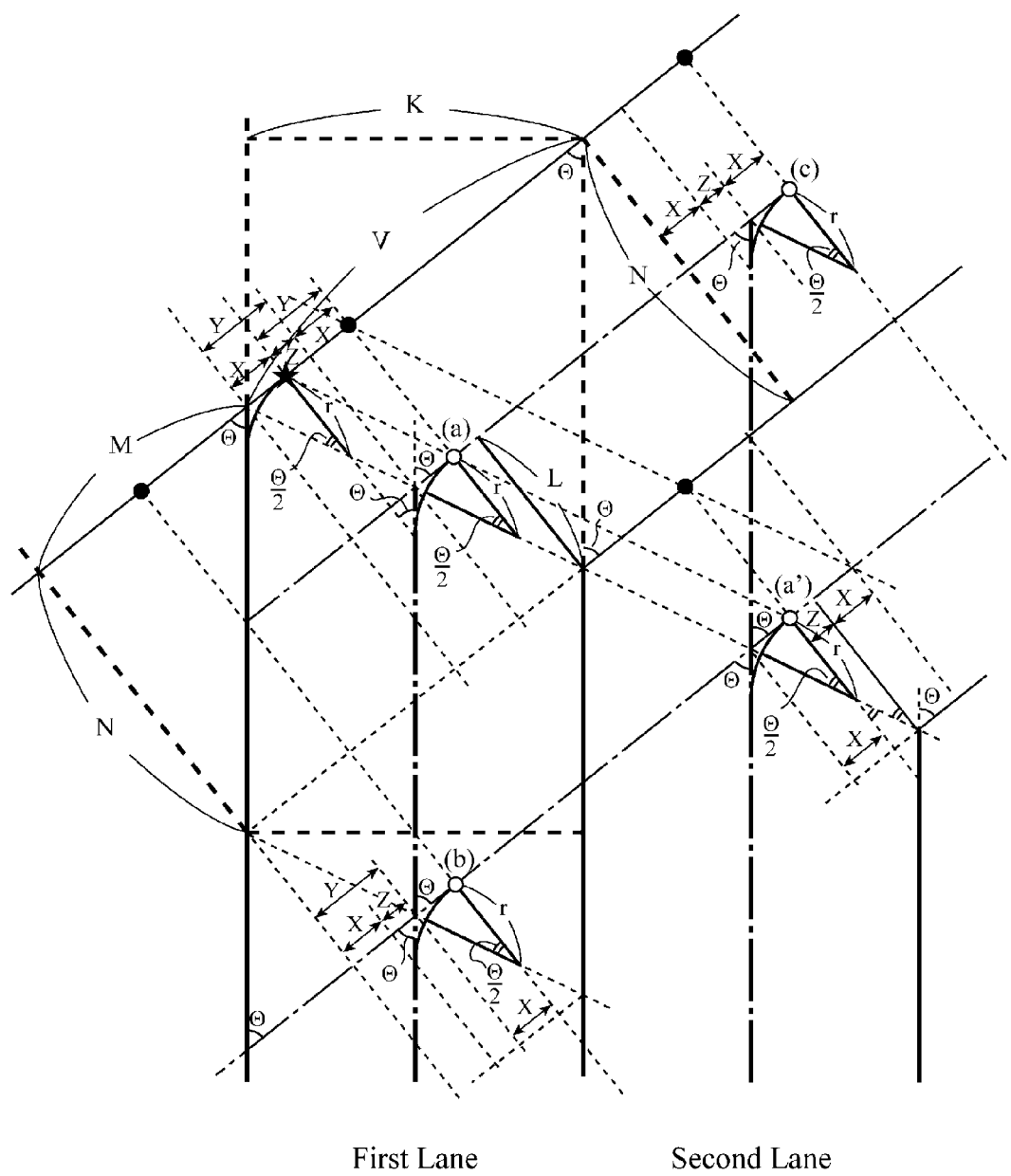
FIG. 13 is a view showing the principle underlying derivation of the correction distance computation expressions at the time when the vehicle makes a right-hand turn in the right-hand traffic.

FIG. 13 is a view showing the principle underlying derivation of the correction distance computation expressions at the time when the vehicle makes a right-hand turn in the right-hand traffic. As shown in FIG. 13, in the case of the right-hand traffic, the lane numbers of the lands of the road are referred to as the first lane, the second lane, and . . . from the left-hand side of the road in order. In this figure, each white circle symbol shows the actual vehicle position, a black star symbol shows the vehicle position on the matching link which is recognized by the navigation device 1, and each black circle symbol shows the position which is corrected in consideration of the distance error at the branch point of the vehicle.

When the vehicle makes a right-hand turn, the angle counter 7-3 counts the gyro angle Θ. When the vehicle makes a right-hand turn while traveling along the road whose lane number is two, the actual vehicle position has four possible patterns as shown by the four white circle symbols in FIG. 13, while the corrected position can be divided into the following three patterns as shown by the black circle symbols.

In the Case of (a) and (a')

In either of the cases, after making the right-hand turn, the vehicle has been traveling along the same lane as that along which the vehicle had been traveling before making the right-hand turn. In the case of (a), the vehicle had been traveling along the first lane before making the right-hand turn, and has been traveling along the first lane also after making the right-hand turn. In the case of (a'), the vehicle had been traveling along the second lane before making the right-hand turn, and has been traveling along the second lane also after making the right-hand turn.

In the Case of (b)

In this case, the vehicle had been traveling along the inner lane (the first lane) before making the right-hand turn, and has been traveling along the outer lane (the second lane) after making the right-hand turn.

In the Case of (c)

In this case, the vehicle had been traveling along the outer lane (the second lane) before making the right-hand turn, and has been traveling along the inner lane (the first lane) after making the right-hand turn. In any case in which the lane determination cannot be carried out, it can be determined that the case of (a) or (a') has occurred.

In a case in which the vehicle is traveling along the road whose lane number is 3 or more, no change is made to the correction distance in the case of (a) or (a'), the correction distance is calculated by using M which is multiplied by a factor of (A−B) in the case of (b), and the correction distance is calculated by using V which is multiplied by a factor of (B−A) in the case of (c). The calculation of the correction distance is carried out by using the before-branch road lane number B, the after-branch road lane number A, the before-branch road lane width K, the after-branch road lane width N (N is two times as long as the distance width L from the center line of the road after branch), the distance width L from the center line of the road after branch, and the value β of the angle counter 7-3.

Calculation of the Correction Distance
In the Case of (a) and (a′)

It is necessary to advance the vehicle position on the matching link (the black star symbol) toward the traveling direction (the positive direction) by the correction distance: (Z+X) so as to correct the vehicle position to provide the corrected position (the black circle symbol). Since Z=Y−X, (Z+X)=(Y−X+X) and the correction distance is equal to Y. Furthermore, by taking into consideration N=2L, the following equation is obtained.

$$Y = L\tan(\beta/2) = L\tan(\beta/2) = (N/2)\tan(\beta/2)$$

Thus, because the correction distance has a positive value, the vehicle position is corrected in such a way that the position of the vehicle after making the right-hand turn is advanced. Because the same computation expression to calculate the correction distance can be used even in the case in which the vehicle is traveling along the road whose lane number is 3 or more, the correction distance in the case of (a) and (a′) can be shown by the following equation.

$$\text{Correction distance} = (N/2)\tan(\beta/2)$$

In the Case of (b)

It is necessary to correct the vehicle position (the black star symbol) on the matching link to provide the corrected position (the black circle symbol) which is retarded in the direction opposite to the traveling direction (the negative direction) by the correction distance: −(X+M−X−Z−X). In this case, by taking into consideration Y=X+Z and Y=L tan(−Θ/2)=L tan (β/2), the following equation: −M+X+Z=−M+Y is obtained. Therefore, the following equation: −M+Y=−M+L tan(β/2) is obtained, and, since M=N/tan Θ=N/tan β, the correction distance Y is given by −(N/tan β)+L tan(β/2). By substituting the following relationship: N=2L into this equation, the correction distance can be expressed by the following equation.

$$\text{Correction distance } Y = -(N/\tan\beta) + (N/2)\tan(\beta/2)$$

In the case in which the vehicle is traveling along the road whose lane number is two, (A−B) is (2−1) and M is multiplied by 1, and in the case in which the vehicle is traveling along the road whose lane number is three or more, M is multiplied by a factor of (A−B). Therefore, the correction distance in the case of (b) can be shown by the following equation.

$$\text{Correction distance} = (B-A)(N/\tan\beta) + (N/2)\tan(\beta/2)$$

In the Case of (c)

It is necessary to correct the vehicle position (the black star symbol) on the matching link to provide the corrected position (the black circle symbol) which is advanced toward the traveling direction (the positive direction) by the correction distance: (V−X+X+Z+X). In this case, Z=Y−X, and (V+Z+X)=V+(Y−X)+X. Furthermore, because the correction distance Y is equal to V+Y, Y=L tan(Θ/2)=L tan(β/2)=(N/2)tan (β/2), and V=K/sin Θ=K/sin β, the correction distance Y can be expressed by the following equation.

$$Y = V + Y = (K/\sin\beta) + (N/2)\tan(\beta/2)$$

In the case in which the vehicle is traveling along the road whose lane number is two, (B−A) is (2−1) and V is multiplied by 1, and in the case in which the vehicle is traveling along the road whose lane number is three or more, V is multiplied by a factor of (B−A). Therefore, the correction distance in the case of (c) can be shown by the following equation.

$$\text{Correction distance} = (B-A)(K/\sin\beta) + (N/2)\tan(\beta/2)$$

As mentioned above, when the vehicle makes a turn at a branch point, the navigation device in accordance with this Embodiment 1 calculates the distance difference between the position of the vehicle which is map-matched onto a road link, and the position acquired by perpendicular-mapping the actual position of the vehicle at the branch point onto the above-mentioned road link from the lane width K of a road lane along which the vehicle had been traveling before making the turn at the branch point, the lane width N of a road lane along which the vehicle has been traveling after making the turn at the branch point, and the lane number B of the road lane before the branch point, the lane number A of the road lane after the branch point, and the turning angle Θ of the vehicle at the branch point, so as to correct the vehicle position in such a way that the vehicle position is the above-mentioned perpendicular-mapped position. By doing in this way, the navigation device can correct the vehicle position which the navigation device determines from the GPS positioning results at the branch point in consideration of the turn of the vehicle at the branch point to provide a correct position. Particularly, because the navigation device determines a start time at which the vehicle starts the turn and an end time at which the vehicle ends the turn and acquires the information about the lanes before and after the vehicle makes the turn at the branch point to correct the vehicle position by using this information, the navigation device can correct the distance error occurring in the vehicle position at the branch point appropriately and carry out the map matching with a high degree of precision.

In above-mentioned Embodiment 1, the case in which the present invention is applied to the vehicle-mounted navigation device mounted in a vehicle is shown. The present invention is not limited to this case, and the present invention can be applied to any navigation device as long as it is used while being mounted in a moving object. For example, the present invention can be applied to a navigation device mounted in a motorcycle, a bicycle, or the like in which a gyro sensor can be mounted.

INDUSTRIAL APPLICABILITY

Because the navigation device in accordance with the present invention can correct the position of a moving object at a branch point which the navigation device determines from the GPS positioning results in consideration of a turn of the moving object at the branch point to provide a correct position of the moving object, the navigation device in accordance with the present invention is suitable for use as a navigation device having a function of correcting the distance error occurring in the map matching, or the like.

The invention claimed is:

1. A navigation device mounted in a moving object and provided with a positioning unit for measuring a position of said moving object, a turning angle detecting unit for detecting a turning angle of said moving object, and a traveling lane detecting unit for detecting a traveling lane along which said moving object is traveling, wherein said navigation device comprises:

a turn determining unit for determining a turn start and a turn end of said moving object at a branch point on a traveling route, which is determined from map data, on a basis of the turning angle of said moving object at said branch point which is detected by said turning angle detecting unit;

a traveling lane information acquiring unit for acquiring a width of a lane of a road along which said moving object had been traveling before making a turn at said branch point and a width of a lane of a road along which said moving object has been traveling after making the turn at said branch point, and a lane number assigned to the road along which said moving object had been traveling before making the turn at said branch point and a lane number assigned to the road along which said moving object has been traveling after making the turn at said branch point from the map data by using both the traveling lane of said moving object detected by said traveling lane detecting unit, and results of the determination obtained by said turn determining unit; and a matching correcting unit for map-matching the position of said moving object measured by said positioning unit onto a road link of the traveling route in the map data, and for calculating a distance difference between said position of said moving object which is map-matched onto said road link, and a position acquired by perpendicular-mapping an actual position of said moving object at said branch point onto said road link from the width and the lane number of the lane along which said moving object had been traveling before making the turn at said branch point and the width and the lane number of the lane along which said moving object has been traveling after making the turn at said branch point, which are acquired by said traveling lane information acquiring unit, and the turning angle of said moving object at said branch point detected by said turning angle detecting unit, so as to correct the position of said moving object in such a way that the position of said moving object is said position acquired through the perpendicular mapping.

2. The navigation device according to claim 1, wherein when the lane number of the lane along which said moving object has been traveling after making the turn at the branch point is the same as that of the lane along which said moving object had been traveling before making the turn at the branch point, the matching correcting unit calculates the distance difference between the position of said moving object at said branch point which is map-matched onto the road link, and the position acquired by perpendicular-mapping the actual position of said moving object at said branch point onto said road link by using a computation expression: $(N/2)\tan(\Theta/2)$, where N is the lane width of the lane along which said moving object has been traveling after making the turn at the branch point, and the turning angle of said moving object at said branch point is $\Theta$, when the lane number of the lane along which said moving object has been traveling after making the turn at the branch point is larger than that of the lane along which said moving object had been traveling before making the turn at the branch point, the matching correcting unit calculates the distance difference by using a computation expression: $(B-A)(N/\tan\Theta)+(N/2)\tan(\Theta/2)$, where the lane number of the lane along which said moving object had been traveling before making the turn at the branch point is B, and the lane number of the lane along which said moving object has been traveling after making the turn at the branch point is A, and, when the lane number of the lane along which said moving object has been traveling after making the turn at the branch point is smaller than that of the lane along which said moving object had been traveling before making the turn at the branch point, the matching correcting unit calculates the distance difference by using a computation expression: $(B-A)(K/\sin\Theta)+(N/2)\tan(\Theta/2)$, where K is the lane width of the lane along which said moving object had been traveling before making the turn at the branch point.

3. The navigation device according to claim 1, wherein said navigation device comprises an attachment distance setting unit for setting a distance from a position of a head of the moving object to an attachment position where the turning angle detecting unit is attached to said moving object, and said matching correcting unit adds the distance to said attachment position set by said attachment distance setting unit to the position acquired by perpendicular-mapping the actual position of said moving object at the branch point onto the road link so as to calculate a corrected position of said moving object.

4. The navigation device according to claim 1, wherein said navigation device comprises a traffic side setting unit for setting information showing whether roads along which the moving object travels are ruled by right-hand traffic or left-hand traffic, and wherein the turn determining unit inverts a sign of the turning angle of said moving object detected by the turning angle detecting unit according to whether the information shows either the right-hand traffic or the left-hand traffic to determine the turn start and the turn end of said moving object at the branch point, and the matching correcting unit inverts the sign of the turning angle of said moving object detected by said turning angle detecting unit according to whether the information shows either the right-hand traffic or the left-hand traffic to correct the position of said moving object.

\* \* \* \* \*